(12) United States Patent
Crites

(10) Patent No.: US 9,845,140 B2
(45) Date of Patent: Dec. 19, 2017

(54) HIGH ALTITUDE BALLOON AND METHOD AND APPARATUS FOR ITS MANUFACTURE

(71) Applicant: Austyn D. Crites, Reno, NV (US)

(72) Inventor: Austyn D. Crites, Reno, NV (US)

( * ) Notice: Subject to any disclaimer, the term of this patent is extended or adjusted under 35 U.S.C. 154(b) by 28 days.

(21) Appl. No.: 14/746,835

(22) Filed: Jun. 22, 2015

(65) Prior Publication Data

US 2015/0367928 A1 Dec. 24, 2015

Related U.S. Application Data

(63) Continuation-in-part of application No. 14/543,444, filed on Nov. 17, 2014.

(Continued)

(51) Int. Cl.
| | | |
|---|---|---|
| *B64B 1/40* | (2006.01) | |
| *B64B 1/58* | (2006.01) | |
| *F41J 9/08* | (2006.01) | |
| *B29D 22/02* | (2006.01) | |
| *B29C 65/08* | (2006.01) | |
| *B29C 65/48* | (2006.01) | |
| *B29C 65/50* | (2006.01) | |
| *B29C 65/00* | (2006.01) | |
| *B29D 22/04* | (2006.01) | |
| *B29L 22/02* | (2006.01) | |

(52) U.S. Cl.
CPC .............. *B64B 1/40* (2013.01); *B29C 65/087* (2013.01); *B29C 65/4815* (2013.01); *B29C 65/5021* (2013.01); *B29C 65/5042* (2013.01); *B29C 66/1142* (2013.01); *B29C 66/43* (2013.01); *B29C 66/73921* (2013.01); *B29C 66/81433* (2013.01); *B29C 66/8221* (2013.01); *B29C 66/83413* (2013.01); *B29D 22/02* (2013.01); *B29D 22/04* (2013.01); *B64B 1/58* (2013.01); *B29C 66/133* (2013.01); *B29C 66/71* (2013.01); *B29L 2022/022* (2013.01); *Y10T 156/1051* (2015.01); *Y10T 156/1052* (2015.01); *Y10T 156/12* (2015.01); *Y10T 156/1712* (2015.01); *Y10T 156/1744* (2015.01)

(58) Field of Classification Search
CPC ................ B64B 1/14; B64B 1/40; B64B 1/58
See application file for complete search history.

(56) References Cited

U.S. PATENT DOCUMENTS

| | | | | |
|---|---|---|---|---|
| 3,113,748 | A * | 12/1963 | Struble, Jr. ............... | B64B 1/58 244/31 |
| 6,290,172 | B1 * | 9/2001 | Yajima ..................... | B64B 1/58 244/31 |

(Continued)

*Primary Examiner* — Philip J Bonzell

(57) ABSTRACT

A high altitude balloon, including a method and machine for manufacture, uses a perimeter border strip to couple two circular balloon panels with a lap or butt seal. Simultaneous sealing of two perimeter seals, one between the border strip and each of two balloon panels, is provided by supporting stacked balloon panels on a rotatable support and sealing around the full perimeter of the two interposed balloon panels and the border strip. The method and machine for manufacture allow for the mass production of high altitude balloons and minimize necessary material handling. The perimeter border strip can be dispensed and guided relative to the perimeter of the balloon panels for positioning before sealing together, as a bonding device is rotated relative to the balloon envelope.

23 Claims, 19 Drawing Sheets

Related U.S. Application Data

(60) Provisional application No. 62/116,035, filed on Feb. 13, 2015, provisional application No. 62/015,288, filed on Jun. 20, 2014.

(56) References Cited

U.S. PATENT DOCUMENTS

| | | | | |
|---|---|---|---|---|
| 7,687,129 B2 * | 3/2010 | Liggett | ................ | A41D 27/245 |
| | | | | 244/131 |
| 7,704,579 B2 * | 4/2010 | Brewer | ................ | A41D 27/245 |
| | | | | 428/61 |
| 7,790,261 B2 * | 9/2010 | Liggett | ................ | A41D 27/245 |
| | | | | 244/131 |
| 7,799,165 B2 * | 9/2010 | Brewer | ................ | A41D 27/245 |
| | | | | 156/304.4 |
| 7,954,536 B2 * | 6/2011 | Brewer | ................ | A41D 27/245 |
| | | | | 156/581 |
| 8,003,185 B2 * | 8/2011 | Liggett | ................ | A41D 27/245 |
| | | | | 244/131 |
| 8,186,625 B2 * | 5/2012 | De Jong | ................ | B64G 1/222 |
| | | | | 244/158.3 |
| 9,193,480 B2 * | 11/2015 | Smith | ................ | B64B 1/44 |
| 9,463,861 B2 * | 10/2016 | Smith | ................ | B64B 1/44 |
| 2008/0078883 A1 * | 4/2008 | de Jong | ................ | B64G 1/222 |
| | | | | 244/158.3 |
| 2014/0158823 A1 * | 6/2014 | Smith | ................ | B64B 1/44 |
| | | | | 244/1 A |

* cited by examiner

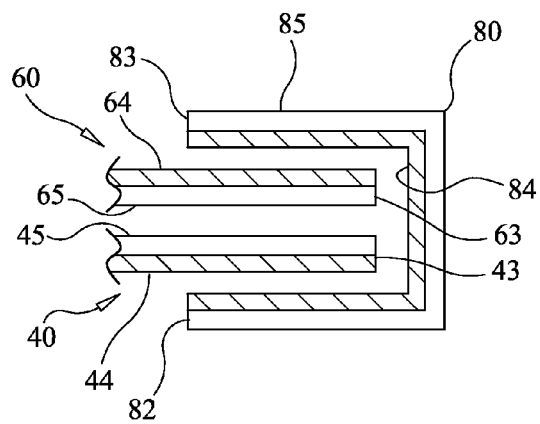
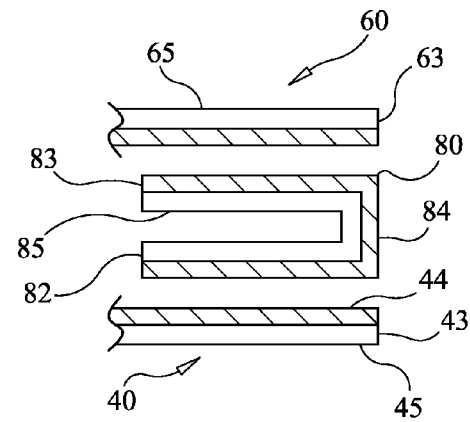
FIG. 4A
FIG. 4B
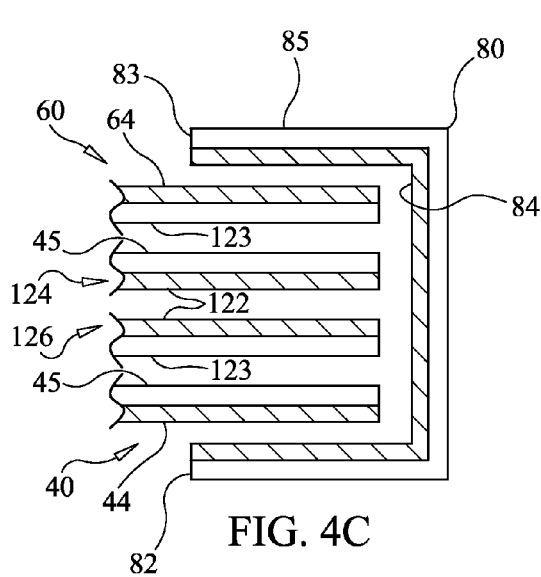
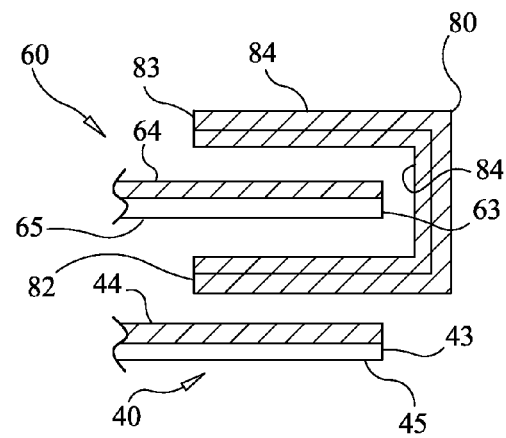
FIG. 4C
FIG. 4D

HIGH ALTITUDE BALLOON AND METHOD AND APPARATUS FOR ITS MANUFACTURE

CROSS-REFERENCE TO RELATED APPLICATIONS

This application is a nonprovisional of and claims the benefit of U.S. Provisional Patent Application 62/116,035, filed Feb. 13, 2015, and titled High Altitude Balloon and Method and Apparatus for its Manufacture; U.S. Nonprovisional patent application Ser. No. 14/543,444, filed Nov. 17, 2014, and titled High Altitude Balloon; and U.S. Provisional Patent Application 62/015,288 filed Jun. 20, 2014, and titled High Altitude Balloon, which are each herein entirely incorporated by reference.

FIELD OF THE INVENTION

The present invention relates to the production and structure of balloons and more particularly to high altitude balloons.

BACKGROUND

A high altitude balloon refers to manned and unmanned balloons that can be released at ground level and climb into the troposphere, stratosphere, and even the mesosphere. High altitude balloons are filled with a lifting gas or with air maintaining an internal temperature higher than its surrounding atmospheric air temperature, thus generating lift. Prior high altitude balloons are made up of a large number of gores attached to each other. The term "gore" refers to a tapering sector of a curved surface, such as the typical tapering panels of a hot-air balloon, parachute, beach ball, or conventional plastic film high altitude balloon. A "gored balloon," as used herein, refers to a balloon comprised of a body having a plurality of gores attached to each other.

Existing gored balloons are formed by carefully cutting and connecting tens, and up to hundreds, of gores to form the balloon body, often referred to as the envelope. Envelopes are made on long tables with a multitude of complex seams and end termination caps. The process of attaching the balloons' numerous tapered gores to one another is performed mainly by a hand guided process that plays a significant role in the large amounts of time, and thus costs, invested in the balloons' manufacture and handling. As a result, lighter-than-air product manufacturers have been unable to significantly increase high altitude balloon production. These substantially hand-fabricated balloons also inherently have variations in performance, such as leak resistance and flight duration, because the production of each balloon is performed slightly differently than the others. Seams leak, manufacture is often inconsistent, and the cost per balloon is high because of the manual labor required. Because of the above mentioned factors, the mass production of high altitude balloons, including zero pressure high altitude balloons and superpressure high altitude balloons, has remained unavailable.

The membrane (or film or material) typically used for high altitude balloons is thin and delicate compared to most other inflatable products. In order to float to high altitudes with a minimum balloon surface area and minimum amount of lift gas, only lightweight materials are suitable for the high altitude balloon membrane. Blimps and aerostats, on the other hand, are made from much thicker and robust materials because of their substantially lower altitude requirements.

Maneuvering high altitude balloon materials in the envelope fabrication process has proven very difficult to achieve on a consistent basis, and as such, the margin for error is very low. The slightest slip of a film guiding hand can cause a failure inducing wrinkle or leak path anywhere along the myriad of seam lengths, and manually maneuvered heat sealing machines used to couple together adjacent gores often vary the quality of seam strength and integrity. Even if just an inch out of hundreds of feet in seam quality is compromised, the balloon will quickly fail at its weakest point and descend. Thus, the assembly of conventional gored balloons requires countless manual labor hours, excessive material handling, specialized equipment, and years of domain expertise to correctly complete.

As a result of recent increased demand for high altitude balloons for telecommunications purposes, among a host of other applications, it is now desirable to build large constellations of reliable floating platforms that can remain in the troposphere, stratosphere, and mesosphere. To achieve the desired performance of remaining aloft for months at a time and production at a fraction of current costs, the balloon production must be highly automated to achieve mass production on a consistent, reliable basis. It is therefore desirable to replace manual balloon manufacturing with more controllable automation technologies. Efficient automated mass production of other inflatable products, such as large liquid bladders, flexible gas containers, water sport toys, advertising balloons, blimps, among other lighter-than-air and general inflatable uses, is also desirable.

SUMMARY

The present invention may comprise one or more of the features recited in the attached claims, and/or one or more of the following features and combinations thereof.

The present high altitude balloon, including a method and machine for manufacture, uses a perimeter border strip to couple two circular balloon panels with a lap or butt seal. Simultaneous sealing of two perimeter seals, one between the border strip and each of two balloon panels, is provided by supporting stacked balloon panels on a rotatable support and sealing around the full perimeter of the two interposed balloon panels and the border strip. The method and machine for manufacture allow for the mass production of high altitude balloons and minimize necessary material handling. The perimeter border strip material can be dispensed and guided relative to the perimeter of the balloon panels for positioning before sealing together, as a bonding device is rotated relative to the balloon envelope.

An illustrative high altitude balloon according to the present invention includes a first panel having at least a first perimeter, a second panel having at least a first perimeter, and a border strip. The border strip includes a first portion and a second portion across a width of the strip. The first portion is coupled with the first perimeter of the first panel and the second portion is coupled with the first perimeter of the second panel, such that upon inflation of the balloon, the first perimeter of the first panel is positioned adjacent to the first perimeter of the second panel and the border strip sealingly couples the first panel and the second panel.

An illustrative high altitude balloon according to the present invention can accomplish the coupling of the border strip and the first perimeter of the first panel by forming a first lap seal and the coupling of the second portion of the border strip and the first perimeter of the second panel by forming a second lap seal.

An illustrative high altitude balloon according to the present invention can be hermetically sealed by overlapping the lead end and the tail end of the border strip and sealing together the lead and tail ends with a termination seal. The seal can span both the first lap seal and the second lap seal, thereby hermetically sealing the balloon.

An illustrative high altitude balloon according to the present invention can also utilize a union joint section of material to couple the lead and tail end of the border strip, thereby hermetically sealing the balloon.

An illustrative high altitude balloon according to the present invention can utilize the first and second panels and border strip to form a balloon envelope having a hermetic seal.

The first and second panels of an illustrative high altitude balloon may be substantially circular.

An illustrative high altitude balloon according to the present invention can include an inflation port and a port closure. The inflation port can be a hole, through at least one of the first panel, the second panel, and the border strip, and the port closure can be heat sealed over the hole to the at least one of the first panel, the second panel, and the border strip. The inflation port can also include a reinforcing layer spanning the hole, the reinforcing layer coupled to the at least one of the first panel, the second panel, and the border strip.

An illustrative high altitude balloon according to the present invention can utilize a first panel and second panel, each having a heat sealable surface and at least one of the first and second panels having a non-heat sealable surface. The heat sealable surfaces of the first and second panels can face outwards and the non-heat sealable surfaces of the panels can face inwards. The border strip can have at least one heat sealable surface sealed to the heat sealable surface of the first panel and the heat sealable surface of the second panel. Alternatively, the heat sealable surfaces of the first and second panels can face inwards and the border strip can include at least one heat sealable surface and one non-heat sealable surface, the heat sealable surface sealed to the inward facing heat sealable surface of the first panel and the inward facing heat sealable surface of the second panel.

An illustrative high altitude balloon according to the present invention can also include at least one internal bladder. The at least one internal bladder can include a third panel and a fourth panel, each of the third and fourth panels having at least one heat sealable surface. The heat sealable surfaces of the third and fourth panels can face inwards and define a fin seal therebetween and adjacent the perimeters of the third and fourth panels.

At least one of the first and second panels of an illustrative high altitude balloon according to the present invention can consist of a plurality of sub-sections coupled together.

The border strip of an illustrative high altitude balloon according to the present invention can have substantially equal tensile strength and substantially equal maximum pressure resistance as at least one of the first panel and the second panel.

At least one of the first and second panels of an illustrative high altitude balloon according to the present invention can include at least one of a radiation resistant material and a radiation resistant coating, at least one of a radiation reflective material and a radiation reflective coating, and/or at least one of a radiation absorbent material and a radiation absorbent coating.

An illustrative high altitude balloon according to the present invention can include a payload positioned inside the balloon.

An illustrative high altitude balloon according to the present invention can include a reinforcement patch heat sealed to an outside surface of at least one of the first panel, the second panel, and the border strip. The balloon can also include a payload line guided by the reinforcement patch.

An illustrative high altitude balloon according to the present invention can include at least one line spanning a substantially vertical circumference of the first panel and the second panel, the at least one line providing balloon lobing. The balloon can also include a plurality of tubular guides, each of the plurality of tubular guides guiding at least one line, and each of the plurality of tubular guides heat sealed to at least one of the border strip, the first panel, and the second panel.

An illustrative apparatus for making the envelope of a high altitude balloon according to the present invention can include a support device for supporting the at least first and second balloon panels of the envelope, the second balloon panel overlying the first balloon panel. The illustrative apparatus can also include a bonding device for bonding the first and second balloon panels to form the envelope, and a motion device. In an illustrative apparatus, the bonding device can be a thermoplastic sealing device, for example, but not limited to, a rotary ultrasonic sealer.

The motion device can be operatively coupled to at least one of the support device and the bonding device to move the bonding device relative to and adjacent to the full circumference of curvilinear edges of the first and second balloon panels, thereby bonding the at least first and second balloon panels to form the envelope.

An illustrative apparatus for making the envelope of a high altitude balloon according to the present invention can include a rotary drive. The rotary drive can include a portion of the bonding device in mechanical contact with the envelope and/or a pair of rotary wheels, the pair of rotary wheels aligned to parallel axes and a periphery of each of the pair of rotary wheels positioned adjacent to the others and capable of exerting a mechanical pressure therebetween. At least one of the first and second balloon panels can be positioned between the pair of rotary wheels.

The apparatus can also include a securing device applying mechanical pressure to secure the first and second panels about a central axis of the support device, such that the rotary drive applies a lateral force on the envelope and the rotational axis of the rotary drive is out of alignment with a radius line perpendicular to and intersecting the central axis such that the lateral force includes a component vector that is directed radially outward from the center of the first and second panels.

The apparatus can further include a support device, rotatable about the central axis, such that the lateral force further includes a component vector that is directed tangential to the curvilinear edges, the lateral force rotating the envelope and the support device about the central axis such that the bonding device translates adjacent to the circumference of the curvilinear edges of the first and second balloon panels.

In an illustrative apparatus for making the envelope of a high altitude balloon according to the present invention, the rotary drive can include a portion of the bonding device in mechanical contact with the envelope.

An illustrative apparatus for making the envelope of a high altitude balloon according to the present invention can include a guiding device positioned adjacent a perimeter of the envelope, the guiding device having an entry end and an exit end. The envelope can also include a border strip, such that the entry end receives at least one of the border strip and at least one of the first and second balloon panels. The exit end can aid the relative positioning of the border strip and the first and second balloon panels such that the border strip overlaps a curvilinear edge of at least one of the first and second balloon panels.

The bonding device can be positioned adjacent the exit end of the guiding device, such that the bonding device bonds the border strip to the first and second balloon panels.

An illustrative apparatus for making the envelope of a high altitude balloon according to the present invention can include a dispenser for dispensing the border strip from a roll to the entry end of the guiding device.

The entry end of the guiding device can include a pair of channels oriented to receive and guide respective edges of the border strip, the channels curvilineal extending toward each other along the length of the guiding device to a substantially parallel stacked position at the exit end of the guide so as to fold respective edges of the border strip over a top side and a bottom side of the at least first and second balloon panels along their curvilinear edges for bonding.

An illustrative apparatus for making the envelope of a high altitude balloon according to the present invention can include a closure device for providing a substantially hermetic seal of the envelope. The closure device can be oriented to seal an overlaid lead and a tail end of the border strip, the seal spanning between two parallel circumferential seals formed along the length of the border strip by the bonding device. The closure device can be a thermoplastic sealing device, for example, but not limited to, an impulse sealer.

An illustrative apparatus for making the envelope of a high altitude balloon according to the present invention can include a rotational bearing coupled to a central axis of the support device and allowing the support device to rotate substantially 360 degrees about the central axis. In an alternative illustrative apparatus, the support device is stationary and the bonding device translates adjacent the full circumference of the curvilinear edges of the first and second balloon panels.

An illustrative apparatus for making the envelope of a high altitude balloon according to the present invention can include a trimmer for cutting excess material from the first and second balloon panels, such that the trimmer is operable to cut the first and second balloon panels into a substantially circular shape.

An illustrative apparatus for making the envelope of a high altitude balloon according to the present invention can include a securing device securing at least one of the first and second balloon panels about a central axis of the support device, thereby allowing a tension to be applied to at least one of the first and second balloon panels radially outward from the central axis. The bonding device can be operable to translate radially relative to a center of at least one of the first and second balloon panels. Additionally, a process arm can be included to translate radially relative to a center of at least one of the first and second balloon panels.

An illustrative method for making the envelope of a high altitude balloon according to the present invention can include the steps of positioning a first balloon panel on a support device, overlaying a second balloon panel over the first balloon panel, applying mechanical pressure from a bonding device to both sides of the first and second balloon panels at a location adjacent curvilinear edges of the first and second balloon panels, and moving the bonding device relative to and along the full perimeter of the curvilinear edges of the first and second balloon panels so as to couple the first and second balloon panels, thereby forming the envelope.

An illustrative method for making the envelope of a high altitude balloon according to the present invention can include rotating the support device about a central axis to move the first and second balloon panels relative to the bonding device. A mechanical force can be applied to at least one of the first and second balloon panels, the mechanical force having a component vector tangential to the curvilinear edges of the first and second balloon panels. A mechanical force can be applied to at least one of the first and second balloon panels adjacent the curvilinear edges, the mechanical force having a component vector radially outward from a center of the first and second balloon panels.

The support device of an illustrative method for making the envelope of a high altitude balloon according to the present invention can include a stationary table to support the first and second balloon panels while moving the bonding device around the perimeter of the first and second balloon panels.

An illustrative method for making the envelope of a high altitude balloon according to the present invention can include folding and positioning a border strip relative to the full perimeter of the curvilinear edges of the first and second panels such that the border strip couples each of the first and second panels. The border strip can be guided relative to the bonding device and the curvilinear edges of the first and second balloon panels. A mechanical force can be applied to the border strip, the mechanical force having a component vector forming the border strip to follow the curvilinear perimeter of the first and second balloon panels.

An illustrative method for making the envelope of a high altitude balloon according to the present invention can include forming a plurality of perimeter seals simultaneously, the perimeter seals of uniform radius around a center of the first and second balloon panels.

An illustrative method for making the envelope of a high altitude balloon according to the present invention can include trimming the first and second panels into a substantially circular shape. The trimmed balloon material may be removed by a trim removal tool which can wind up the unneeded film that is to be discarded/recycled.

The step of overlaying the first and second panels according to an illustrative method for making the envelope of a high altitude balloon according to the present invention can provide a heat sealable surface of the first balloon panel facing outwards, a heat sealable surface of the second balloon panel facing outwards, and a non-heat sealable surface of at least one of the first and second panels facing inwards. A border strip can be folded over the curvilinear edge of the first and second balloon panels. The first balloon panel can then be coupled to the second balloon panel by simultaneously forming a bond between the border strip and the first balloon panel and between the border strip and the second panel.

The step of overlaying the first and second panels according to an illustrative method for making the envelope of a high altitude balloon according to the present invention can provide a heat sealable surface of the first balloon panel facing outwards and a heat sealable surface of the second balloon panel facing outwards. A heat sealable surface of the border strip can face the heat sealable surfaces of the first and second balloon panels.

The step of overlaying the first and second panels according to an illustrative method for making the envelope of a high altitude balloon according to the present invention can provide a heat sealable surface of the first balloon panel facing inwards and a heat sealable surface of the second balloon panel facing inwards.

An illustrative method for making the envelope of a high altitude balloon according to the present invention can provide a heat sealable surface of the first balloon panel facing inwards, a heat sealable surface of the second balloon panel facing inwards, and a heat sealable surface of the border perimeter material facing the heat sealable surfaces of the first and second balloon panels.

An illustrative method for making the envelope of a high altitude balloon according to the present invention can include bonding the respective curvilinear edges of the first and second balloon panels to form at least one butt seal.

An illustrative method for making the envelope of a high altitude balloon according to the present invention can include substantially encircling one or more lines along at least one balloon envelope circumference to achieve lobing.

An illustrative method for making the envelope of a high altitude balloon according to the present invention can include forming the first balloon panel by splicing together a plurality of sub-sections.

An illustrative method for making the envelope of a high altitude balloon according to the present invention can include forming a hermetic seal.

An illustrative method for making the envelope of a high altitude balloon according to the present invention can include hot or cold-forming, or stretching at elevated temperatures or at ambient temperature the border strip to substantially follow the curvilinear edges before bonding the border strip to the first and second balloon panels.

An illustrative method for making the envelope of a high altitude balloon according to the present invention can include plastic deformation of the border strip to substantially follow the curvilinear edges.

An illustrative method for making the envelope of a high altitude balloon according to the present invention can include curving the border strip using lateral forces to substantially follow the curvilinear edges while simultaneously bonding the border strip to the first and second balloon panels.

An illustrative method for making the envelope of a high altitude balloon according to the present invention can include forming the first and second balloon panels by folding over a single sheet of material such that the resulting panels remained attached to each other at one or more common outer edges or edge points.

An illustrative method for making the envelope of a high altitude balloon according to the present invention can include forming a first perimeter seal between the first balloon panel and the border strip and a second perimeter seal between the second balloon panel and the border strip around the full perimeter of the envelope, overlapping a lead end and tail end of the border strip, and bonding the lead end to the tail end with a termination seal spanning across the first perimeter seal and the second perimeter seal, thereby hermetically sealing the envelope.

An illustrative method for making the envelope of a high altitude balloon according to the present invention can include simultaneously forming a first seal between the first balloon panel and the border strip and a second seal between the second balloon panel and the border strip around the full perimeter of the envelope, forming a union joint termination seal to complete the first and second perimeter seals between a lead end and a tail end of the border strip, and forming a termination seal spanning across the first perimeter seal and the second perimeter seal, thereby hermetically sealing the envelope.

An illustrative method for making the envelope of a high altitude balloon according to the present invention can include adding at least one line or rope to the border perimeter material before guiding the border perimeter material relative to a bonding device.

An illustrative method for making the envelope of a high altitude balloon according to the present invention can include adding at least a second material layer to the border strip to aid in bonding the border strip with the first and second balloon panels.

An illustrative method for making the envelope of a high altitude balloon according to the present invention can include exerting a mechanical pressure against at least one of the first and second balloon panels and creating a constant tension on at least one of the first and second balloon panels between a center of the first and second balloon panels and the bonding device.

An illustrative method for making the envelope of a high altitude balloon according to the present invention can include laminating a removable carrier layer to the border strip.

An illustrative method for making the envelope of a high altitude balloon according to the present invention can include removing the carrier layer from the border strip after bonding the border strip to at least one of the first and second balloon panels.

An illustrative method for making the envelope of a high altitude balloon according to the present invention can include forming a hole through at least one of the first balloon panel, second balloon panel, and border strip, filling the balloon at least partially with a gas through the inflation port; and affixing a seal over the inflation port hole. The method can also include applying around the hole a strengthening layer on at least one of the first balloon panel, the second balloon panel, and the border strip. The hole can be sealed using a thermoplastic sealing tool.

An illustrative method for making the envelope of a high altitude balloon according to the present invention can include applying a layer on the inside of at least one of the first and second balloon panels to prevent the inside surfaces of the first and second balloon panels from bonding to each other.

The presently disclosed high-altitude balloon and method and apparatus for manufacture enables high numbers of small and large sized balloons to be produced for a fraction of the cost of current balloons. Additionally, the disclosed balloons may be superpressure balloons, long-duration float balloons that can stay aloft for months at a time. Thus the invention makes practical large balloon-borne constellations, a long sought after goal by many commercial and public organizations. High tensile strength materials, such as PET, had long been the preferred material for making superpressure balloons, but were largely abandoned by leading balloon manufacturers because of the difficulty in sealing and resulting pinhole gas leaks. Thus, many superpressure balloons are now manufactured with PE (polyethylene) and PE-based co-extrusions, though this lower tensile strength material, as compared to PET and Nylon for example, typically requires the usage of a plurality of restraint lines to reduce the loads on the balloon panel sections by reducing the local radiuses of film curvature. The present invention also allows for the usage of PE and PE-based co-extrusions, among a host of other conventional and non-conventional balloon film combinations, but it also opens up the possibility for hundreds of other material combinations that are not effectively possible to take advantage of in the current state of the art.

Though 100% polyethylene (PE) materials or less than 100% PE-based materials may be used with the present invention, higher tensile strength materials such as PET, Nylon or a combination of PET and PE among other materials can also be used to mass produce very strong balloon envelopes that often do not require the use of load restraint lines. Whether or not a restraint line is introduced to the balloon envelope depends upon several design factors, including but not limited to: balloon volume and diameter, film thickness, film tensile strength, maximum internal balloon pressure, among other factors known in the industry. The present invention allows for the use of restraint lines when they are needed, but it also opens up the possibly for superpressure balloons to be manufactured without the use of restraint lines, a major labor savings and design simplification advantage.

One embodiment of the present invention advantageously employs rotary ultrasonic machinery, providing improvements in processing speed, cleanliness, and fabrication precision over conventional balloon sealing machinery, for example, but not limited to, continuous band sealers, RF welders, impulse sealers, and hot wheel sealers. The present invention allows for the usage of the above listed and other thermoplastic sealing machines, but it also makes possible use of rotary ultrasonic machinery which is not used or practical in the current state of the art.

A PET/PE film structure, as commonly found in MYLAR (registered trademark of DuPont Teijin Films, Hopewell, Va.) polyester film party balloons, has previously been thought unsuitable for use with ultrasonic sealing machines due to a weakening of the plastic bonds during the sealing process as compared to hot bar die and hot die sealers, impulse sealers, continuous band sealers, heated wheel sealers, and RF sealers. Advantageously, in addition to introducing carrier layers taught by the present disclosure, the innovative border curving technique of the present invention increases seam strength by allowing for a butt-seal seam, rather than only a fin seal seam The present invention also allows for fin seal seams, among many other seal configurations known in the industry, but it also makes possible the use of shear-type lap seals and butt seals.

A butt seal or sheer force seal is much stronger than a typical fin seal that was typically previously employed, particularly when using higher tensile strength balloon material layers such as PET and Nylon. The butt weld seal can be formed by using a border strip bonded to form a seal with each of two adjacent balloon panel sections to form the balloon envelope.

Balloon fabrication preparation and handling time is decreased by utilizing continuous rolls of balloon panel film and employing a circular trimming of the edges around the perimeter of the balloon panels, for example, in one continuous 360 degree rotation of either the balloon panels or the trimming head around the balloon perimeter. Similarly, rotary sealing heads (rotary ultrasonic, hot wheel, continuous band sealer, heated bar with compression roller sealer, rotary impulse, etc.) can provide one continuous 360 degree movement around the balloon panels, for example, to complete a full perimeter seal of the two balloon panels. If the use of a border strip is employed to create a butt seal between the balloon panels, the border strip material may be stored on a large roll and dispensed and/or guided as needed to accommodate rotating the circumferential edges of the panels through 360 degrees.

Advantageously, the border strip can be dispensed over the full perimeter of the curvilinear edges of two or more balloon panels and its opposite ends can be joined by overlapping one another and sealing up over itself, or by using a union joining tab that seals to and between the lead and tail ends of the border strip, thus completing the perimeter seal.

The use of a border strip to connect top and bottom balloon panels around the full perimeter is advantageous for the mass manufacture of high-altitude balloons, and more importantly superpressure balloons, over using several longitudinally extending gore seams. Additionally, the balloon of the present invention can be dispensed in flat panel segments, and may be entirely processed flat and rotationally, eliminating the typical extensive handling of balloon materials involved in manually twisting and turning panels to get them into proper alignment for the next sealing step. The balloon envelope of the present invention stays in place about a central axis, and thus may be automated and the quality of manufacture repeated from one balloon to the next.

The present invention also overcomes prior difficulties with sealing consistently and continuously on a curve.

The method and apparatus of the present invention allow for pre-curving the balloon border or curving of the border strip during manufacture. The pre-curved border can then be bonded to the balloon panels using a host of before-mentioned sealing methods such as RF sealers, ultrasonic sealers, impulse sealers, continuous band sealers (straight or curved) hot wheel sealers, and laser plastic welders among other thermoplastic sealing machines. Rotary sealing methods, such as rotary ultrasonic sealing, hot wheel sealing, continuous band sealing, rotary impulse sealing, and heater bar/compression roller sealing methods, provide an advantage to help curve the border strip during manufacture in that they have a pair of parallel rotating drives, wheels and/or belts, to continually feed and bond the border strip to the panel section perimeters. The constantly rotating wheels and/or belts also can create a consistent opposing radially outward lateral force against the panel sections' centrally located securing device, a tension line, to deform the border strip to closely match the panel perimeter curve and also pull out any balloon film failure inducing wrinkles. The tension line additionally allows for a constant sealing radius of the plurality of simultaneously produced perimeter seals. Stamping and/or indexing sealing machines alone, without the use of additional nip rollers for example, would have a hard time in keeping such a consistent tension line throughout the 360 degree sealing process.

The border strip may be pre-curved before manufacture by way of drawing over a hot or cold form mold or die, among other stretching methods, to introduce mechanical forces that deform the border strip to the required curvature. Also, when a pre-curved border strip is dispensed along a curved balloon panel perimeter, the guiding device can take on a curved shape to better direct the curved border strip into location before the sealing operation takes place. Alternatively, deforming the border strip simultaneously while sealing is practical with mechanically contacting rotary rollers because only a small point of the balloon materials touching the sealing surface at any given time, allowing for easier pivoting and curving. Touching the sealing surface with a larger contact area, such as with a long sealing band or RF/impulse die sealing surface, makes it harder to maneuver a straight border into a curved shape consistently and without the introduction of wrinkles.

Higher tensile strength border strip materials, such as PET and Nylon for example, can be deformed or curved without bringing them to a molten state, which would generally cause damage to such materials' structural integrity, by using mechanical forces, rather than high heat alone, to stretch, twist, and/or deform a flat material into the desired curved shape.

One of the key attributes that allows the border strip to stretch/deform into the needed curve is achieved by securing the balloon panels about a central axis and properly guiding and securing the border strip to a position right before the entrance of the bonding device. As an illustrative example, the presence of too much slack in between where the border strip exits the guiding device and where the border strip is bonded between two rotary wheels can create a condition where the border strip will start to be pulled off to one side of the rollers' face by resulting lateral forces as the border strip will want to travel straight while the secured panel sections will want to rotate the newly bonded border strip in a 360 degree movement. The act of overcorrecting on this lateral force to "pull" the border strip back to the center of the sealing wheels often creates balloon damaging winkles and inconsistent seals by tracking the border strip back and forth in relation to the panel section perimeter. Thus, by dispensing and guiding the border into position relative to the balloon panels immediately preceding the rotary bonding wheels, there is little to no opportunity for the border to track to one side or the other, regardless of the lateral forces present at the back end of the sealing operation. Such securing of the guiding device exit tip to just before the sealer wheels allows for the two competing lateral forces to create an angular torque which consequentially deforms the border strip to follow the balloon panel section perimeter curvature.

The configuration of the two sealing wheels and securing device, a centrally located table weight for example) can create a lateral force on the border which deforms it at the sealing location to the desired form. These lateral forces drive against and stretch the border to the point where it resembles the curved perimeter path of the balloon panels. The smaller the contact point of the rollers, the easier it is to accomplish border curvature because of being able to concentrate all of the lateral forces on a small surface area. The border strip tensile strength, thickness, among other properties will also affect its ability to respond to different levels of lateral force applied to properly deform without compromising the border's structural integrity.

A multitude of rotary wheel sealers, band sealers, and/or other continuous sealing technologies may be used to achieve the perimeter seal for embodiments of the current invention. Hot wheel sealers, for example, may be used with a heat activated seam tape being butt sealed (or double butt sealed) over the perimeter of the panel sections. A hot wheel sealer has one wheel that is heated to a specified temperature which compresses against a second substantially rubberized roller that serves as the seal compression backing. In this way, such a hot wheel sealer can apply both heat and pressure at the same time versus continuous band sealers that use heater bars to heat the substrates and then compress between cooling bars afterwards. Hot wheel sealing technology would be appropriate for embodiments of the current invention and would serve well to both drive and couple panel perimeters simultaneously. Other sealing technology, either those employing continuous rotary movements or intermittent stamping/indexing sealing movements, can introduce nip rollers, compression rollers, among other web handling accessories known in the balloon and packaging industries to maintain the balloon film web tension and ensure that the proper time, heat, and pressure needed to complete each seal is maintained.

Alternative sealing devices may include a band sealer that has been modified with curved heater bars and/or curved PTFE bands to better seal reliably on a curve. This modification of a traditionally straight band sealer is important to consider as many of today's high altitude balloons are manufactured using heater bar and band sealing technology, especially the manufacture of polyethylene high altitude balloons. Such a modification of a band sealer would not be necessary, however, as larger balloon circumferences are substantially straight in nature (e.g. a gentle curve), however such a curved modification would allow the balloon panel segments and/or any required border strip to be consistently heated, fed into location, and coupled without the risk of introducing wrinkles and/or undue lateral stresses. Any such configuration of a continuous band sealer can be mounted horizontally near the side of the spinning (or stationary) table and used to seal the panel sections and border strips.

Yet other sealing device alternatives include curved die segments that may index stamp "hit" multiple seals to complete the 360 degree perimeter seal around the supporting device, such as with a curved constant heat bar die or curved RF sealing die, or an impulse sealer with a curved heater wire and curved pressure pads.

The present invention utilizes a constant outward radial tension during manufacture to both facilitate a constant sealing radius and curvature of the balloon perimeter as well as keep the material layers taut and remove any wrinkles that could otherwise form if any slack were present on any one of the panels being passed through the bonding device. Fixed radius sealing may be accomplished through different securing methods, including securing near the perimeter of the balloon where it is to be sealed rather than at a center point. The present invention seals the entire perimeter of a balloon panel in a substantially 360 degree angle by spinning the panel edges through a fixed sealing point. Alternatively, a track-mounted welding machine may travel in a substantially 360 degree circle along a curved track and complete a continuous seal that ends at or just after where it first began. The proper location and angle orientation of the circular table and sealing apparatus drive rollers, for example rotary ultrasonic sealer or hot wheel sealer roller pairs, is important as they will impact the tension and the rotation of the balloon film being sealed. When the relative orientation of the support table central axis and the sealing wheel axis of rotation are correct, tension will be applied directly perpendicular to the central axis of the balloon panels and remove any potential wrinkles during the bonding process, a great advantage to an industry which currently employs manual labor to ensure that wrinkles are pulled out before a given balloon film is fed into a bonding device.

By applying an additional, optionally removable, carrier layer to the material before sealing, a "superheating" effect may be created that uses some of the residual heat of the melting carrier layer to further melt the inner, and often thinner, heat sealable layers of the balloon panels and border strip. Thus, the body of a generally thicker carrier layer can be melted and sacrificed in order to better and more consistently heat the generally thinner films that are actually desired to be sealed together. The carrier layer can be subsequently removed and discarded/recycled after balloon fabrication is complete in order to reduce balloon weight. In one embodiment a carrier layer is a thicker PE film that is added to the border strip to better seal thinner PET/PE balloon films roughly 20% of the carrier layer's total thickness.

Such a thicker carrier layer technique also allows for the use of ultrasonic wheel teeth patterns with deeper grooves.

Deeper ultrasonic wheel grooves allow the apparatus of the present invention to better grab hold of the film being sealed as well as provide the molten plastic a place to flow to mix with the other film layer to which it is being sealed. Therefore, by using a carrier layer and ultrasonic wheel pattern with deeper grooves, several layers can pass through together, taking on a deeper groove seal pattern, and the thicker outer carrier layers can be discarded/recycled after fabrication. The thinner inside balloon film layers can obtain a consistent heat seal throughout, the width of the seal, and not only at the points where the ultrasonic wheel teeth made mechanical contact with the film, and can thus offer a consistent seal strength comparable to many other reliable forms of thermoplastic sealing. Metallic layers which conduct heat, such as thin aluminum and/or copper layers, may also be introduced as carrier layers to help even out the heat distribution and ensure reliable seal consistency. Such a use of thicker, better melting, metallized, among other characteristic additional carrier layers with ultrasonic sealing machines, and in the manufacture of high altitude balloons in particular, is very novel and advantageous to the industry's further development. In addition to evening out the heat seal temperature and creating a consistent seal quality, the introduction of a carrier layer can lso allow the ultrasonic wheel's teeth edges to grind against the disposable carrier layer rather than grind against the pristine balloon film that must be protected against abrasion at all costs.

Another advantage of using a carrier film is realized when sealing a border strip to two balloon panels. The carrier film allows very thin balloon films to be used as the border which could otherwise become wrinkled if used alone without a thicker and/or stiffening carrier layer. Thus, extremely thin balloons can be manufactured with a carrier film and the carrier film can be removed after the bonding has taken place.

In one embodiment, a commercially available non-adhesive sticky carrier layer is cold-laminated to the border strip to give it extra stabilizing support and protection during sealing operations. Because the sticky carrier layer can be removed with very little effort in a short time and leaves no residue when removed, the lead end of the border strip can have the sticky carrier layer removed after the majority of the perimeter has been sealed and prior to the lead end of the border strip being sealed under the border tail end. In one embodiment, a person's hand or soft spinning brush peels the carrier layer back while the balloon is sealed around the perimeter without interrupting operations. Additionally, such a sticky carrier film may largely remain on the border strip until just prior to launch to protect the border balloon film or inhibit wrinkling of the bordering. In another embodiment, the carrier layer has a low tack adhesive that cold laminates to the border strip and can be removed without leaving behind substantial residue.

Placing a balloon within a balloon is becoming an industry standard for being able to adjust balloon altitudes, and thus balloon flight direction, by way of gas ballast control. Another advantage to the present invention is the ability to simultaneously position and seal together a balloon within a balloon, or a ballast chamber ballonet within an external balloon shell. A particular embodiment of this balloon consists of a two panel balloon with a butt seal curved borderer strip, containing a more traditional two panel fin sealed balloon within it. Unlike with the outside balloon, a fin seal configuration may be utilized on the inside balloon since it does not need to withstand as high of pressures as the outside balloon. In a particular embodiment, the mating faces of the inner balloon seal together while leaving the inner balloon's exterior non-heat sealable. The outer balloon may have a non-heat sealable inner surface and thus will not stick to the exterior of the inner balloon. A butt sealed curved border strip is used to seal up the outer balloon's perimeter edge, encapsulating the inner balloon.

A balloon according to the present invention may include an outside heat sealable surface which allows strengthening or placement patches to be easily heat sealed to the outside of the balloon envelope. Such patches can be used to attach, position, guide, or otherwise locate inflation valves, antennas, sensors, lines, and the like.

BRIEF DESCRIPTION OF THE DRAWINGS

The detailed description particularly refers to the accompanying figures in which:

FIG. 4A shows a cross-section view of an outside lap or butt seal border strip configuration associated with a high altitude balloon according to the present disclosure;

FIG. 4B shows a cross-section view of an of an inside lap or butt seal border strip configuration associated with a high altitude balloon according to the present disclosure;

FIG. 4C shows a cross-section view of an outside balloon lap or butt seal border strip and an internal balloon or bladder fin seal configuration associated with a high altitude balloon according to the present disclosure;

FIG. 4D shows a cross-section view of an overlapping lap or butt seal border strip configuration associated with a high altitude balloon according to the present disclosure;

DESCRIPTION OF THE ILLUSTRATIVE EMBODIMENTS

Figure 1A:
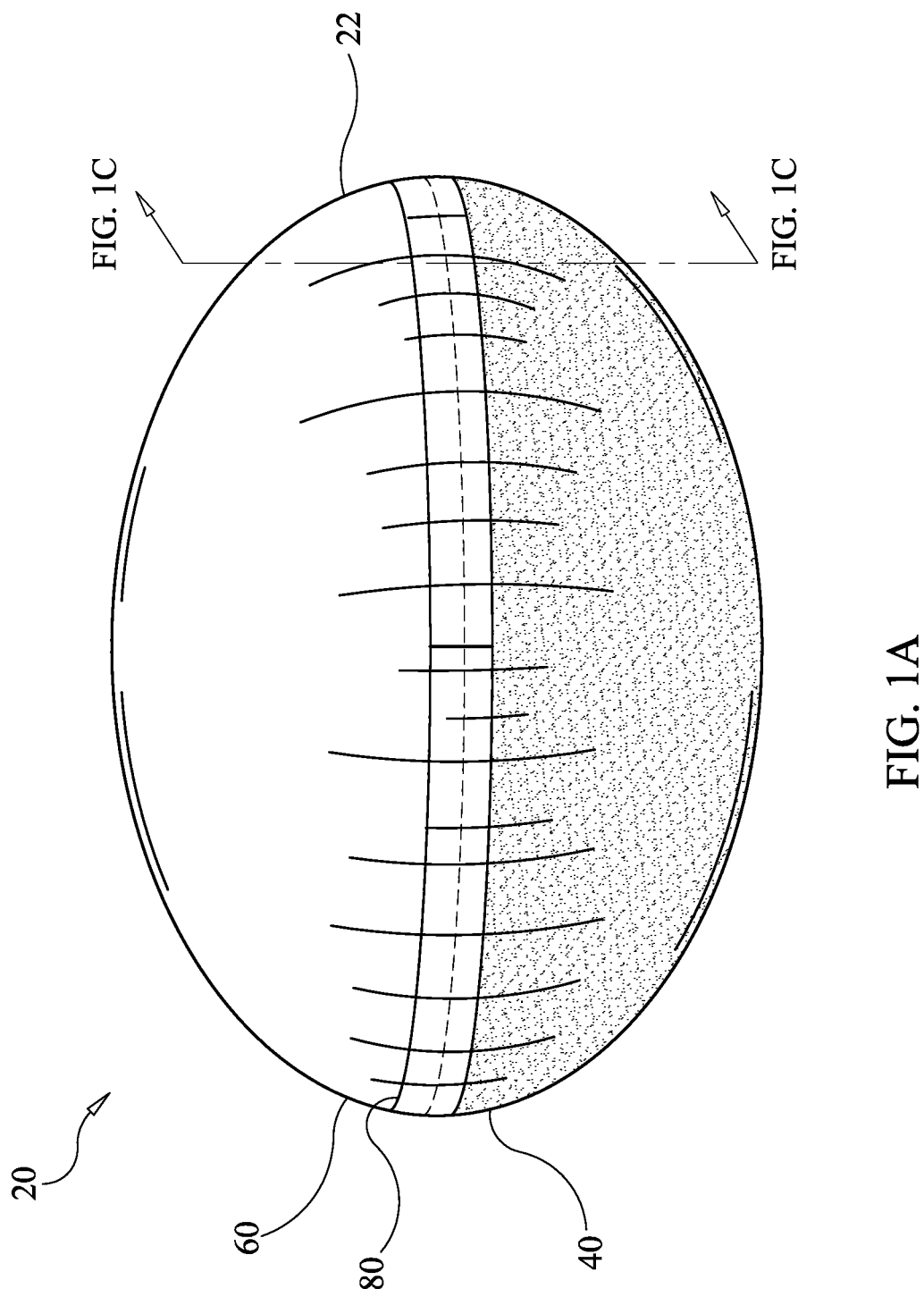
FIG. 1A shows a front perspective view of an illustrative embodiment of a high altitude balloon according to the present disclosure.

For the purposes of promoting and understanding the principals of the invention, reference will now be made to one or more illustrative embodiments illustrated in the drawings and specific language will be used to describe the same.

Illustrative embodiments are directed toward high altitude balloons, particularly hermetically sealed superpressure balloons; however, other high altitude balloons and other non-balloon inflatables may also be constructed according to this disclosure.

Figures 1B, 1C:
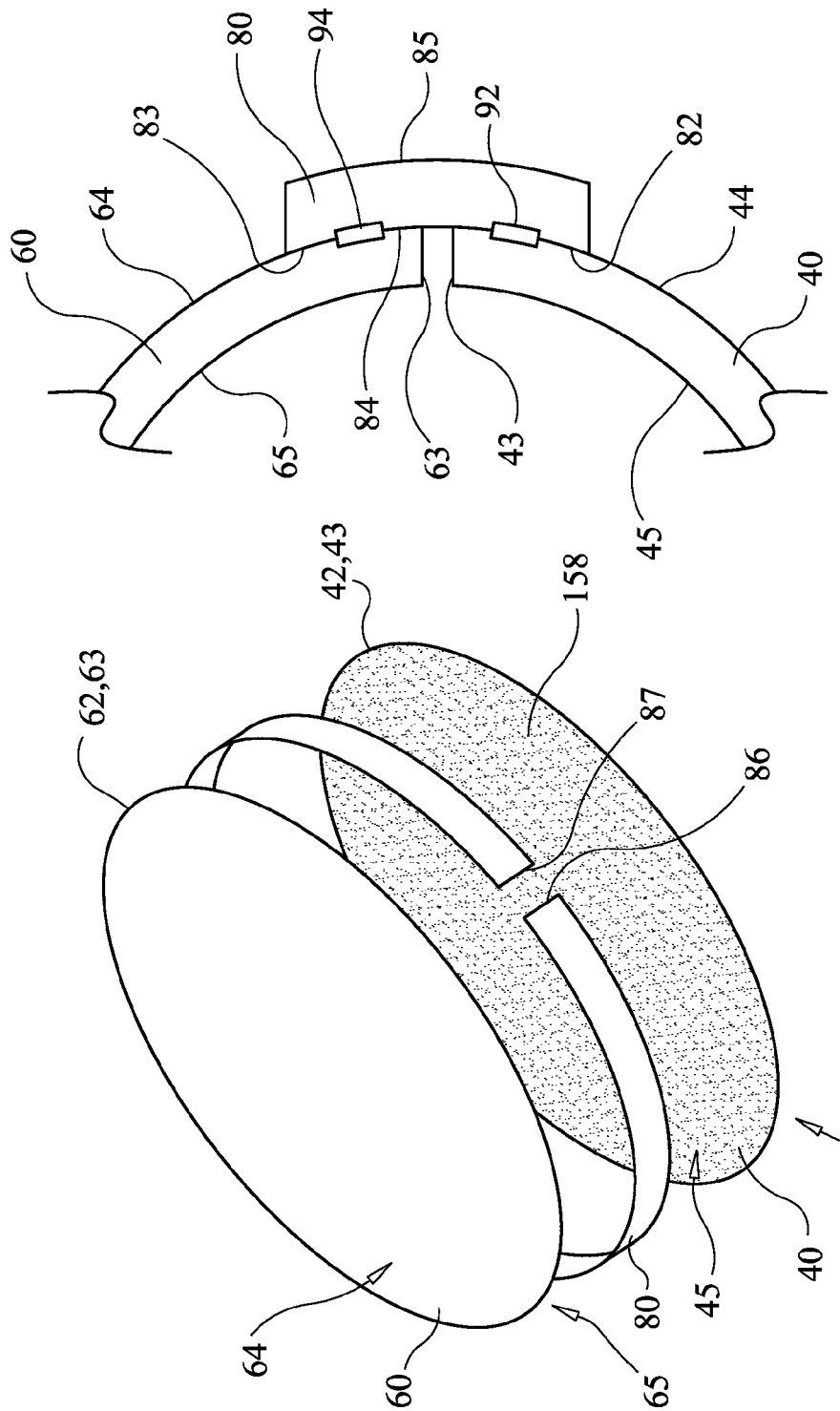
FIG. 1B shows an exploded view of an illustrative embodiment of the high altitude balloon of FIG. 1A.
FIG. 1C shows a cross-section view of a lap or butt seal of the high altitude balloon of FIG. 1A.

Referring to FIGS. 1A and 1B, in one embodiment, a balloon envelope 22 is formed with three parts: a first panel 40, a second panel 60, and a perimeter border strip 80 that is sealingly coupled with each of the first 40 and second 60 panels, creating two seals 92, 94, a first perimeter seal 92 between the border strip 80 and the first panel 40 and a second perimeter seal 94 between the border strip 80 and the second panel 60, as shown in cross-sectional view FIG. 1C.

The three high altitude balloon 20 parts 40, 60, 80 may be stacked flat together, with the border strip 80 folded over the perimeter edges of the first 40 and second 60 panels as shown in FIG. 4A. In this position, the parts are coupled together by making a single perimeter seal 92, thus resulting in two lap seals 92, 94 when opened as shown in FIG. 1C.

Figures 2A, 2B:
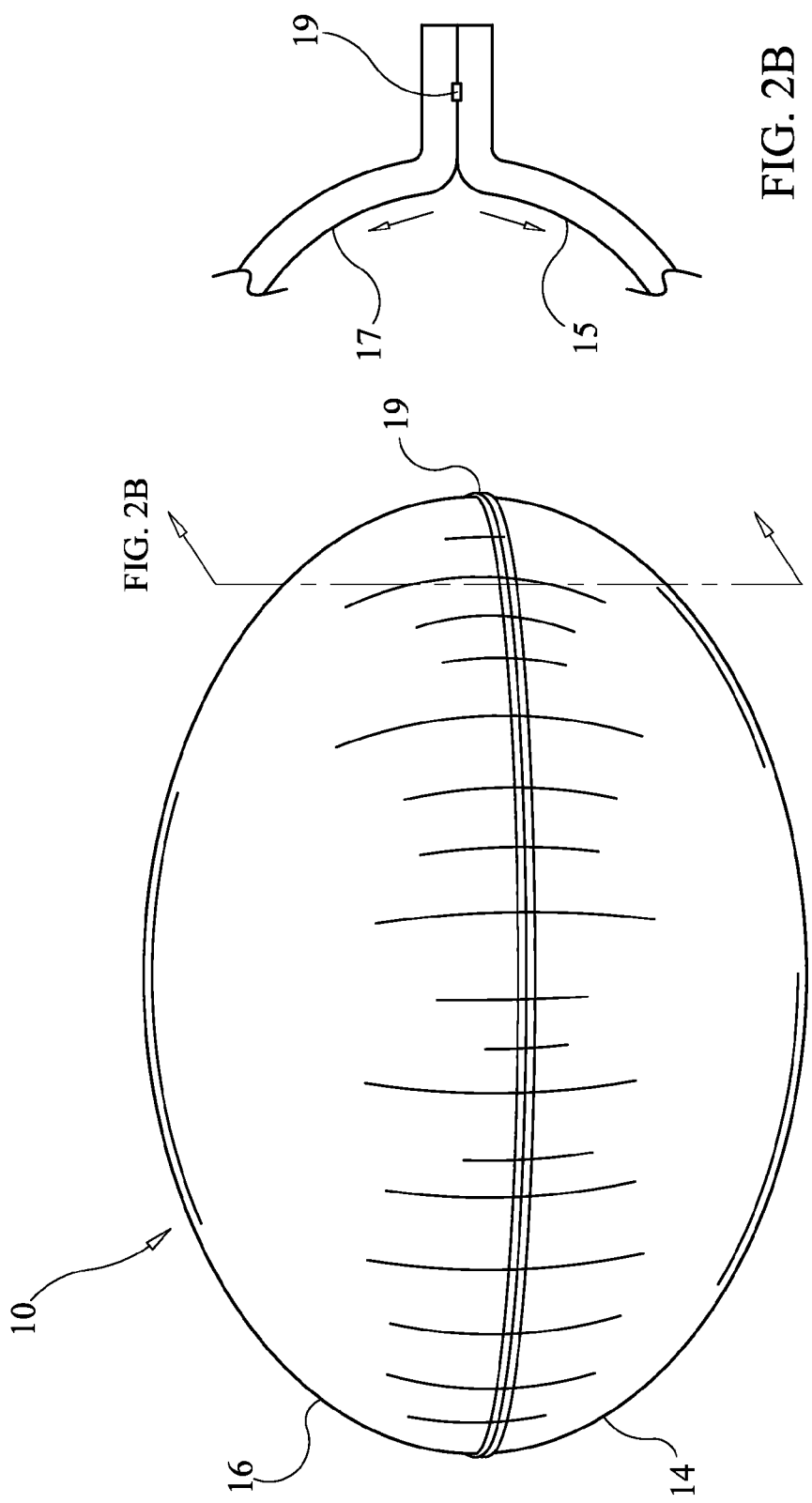
FIG. 2A shows a front perspective view of a prior art balloon.
FIG. 2B shows a cross-section view of a fin seal of the balloon of FIG. 2A.

In the mass production of balloons, one often thinks of either latex balloons or MYLAR (registered trademark of DuPont Teijin Films) polyester film, e.g. polyethylene terephthalate (PET)) party balloons. FIGS. 2A and 2B show the typical prior art balloon film structure of a polyester film balloon 10. The heat sealable sides 15, 17 of the balloon film (sealant film layer is often PE-polyethylene) face inwards toward one another and the non-heat sealable sides 14, 16 (often PET) of the film face outwards. The inward facing PE layers 15, 17 are the sealant layers that bond both film panels together when heat sealed, and the outward facing PET layers 14, 16, are the base layers for general balloon strength, abrasion and gas pressure resistance, and allow the heat seal jaws to seal the inner PE layers without sticking molten plastic to the jaws themselves. PET has a much higher melt temperature than PE, and thus one can melt and heat seal the inner PE layers without melting the outer PET layers.

Polyester film party balloons are generally mass produced by interposing one film on top of another and forming a fin seal 19 between the inner surfaces of the top and bottom panels 15, 17, adjacent a desired shape's perimeter; for example, using a circular shaped heat seal die to hot stamp seal over two film webs, sealing the two flat panels 14, 16 at the seal perimeter line, thus forming a fin seal bond 19, as shown in cross-section in FIG. 2B.

When inflated, these two flat circular panels 14, 16 become the two hemispheres of a substantially spherical (or oval) balloon shape 10, albeit with a number of inflation-developed wrinkles, as shown in FIG. 2A. Advantageously, the wrinkles formed by the inflation of a 2D circular shape into a 3D oval shape are not necessarily problematic for high altitude balloons, and for superpressure balloons in particular. In fact, the wrinkles can even help with pressure retention levels in superpressure balloons and help relieve certain stresses near the circumferential seal.

However, the flat seal of a traditionally sealed polyester film balloon is a fin seal 19 as shown in FIG. 2B. A fin seal will typically fail at or near the fin seal by "peeling" apart in some manner before the film's tensile/yield strength is approached. Such failure is particularly common for larger balloon diameters made from less-extensible material such as polyester with a heat seal layer either lamination or extrusion coated to it. An additional limitation of using a flat web stamping method for the mass manufacture of balloons, particularly in the case of larger superpressure high altitude balloons, is that few machines currently exist that can heat seal stamp much beyond a 40 in. (~1 m.) diameter circular pattern. This limits the balloons to a relatively small size, and while technically possible to increase the size of the machinery to accommodate a larger balloon diameter, the capital expenditure and operational cost for such a large custom machine increases at an exponential rate. The present invention allows for balloons of a much larger diameter than found in most polyester party balloons to be mass manufactured, as well as offering seals that are superior in strength and pressure resistance to a typical flat fin seal.

One embodiment of a high altitude balloon 20 according to the present disclosure modifies the traditional film orientation and improves the conventional balloon's pressure resistance capacity. Referring again to FIG. 1B, a first panel 40 having an outward (up in FIG. 1B) facing heat sealable surface 44, a second panel 60 having an outward (down in FIG. 1B) facing heat sealable surface 64, and a border strip 80 having an inward facing heat sealable surface 84. Several relative placement and orientations of the curvilinear edges 43, 63 along the perimeter of the first 40 and second 60 panels and of the border strip 80 are shown in FIG. 4A. In a flat stack, with relative positions as shown in FIG. 4A, specifically with the non-heat sealable surfaces 45, 65 of the first 40 and second 60 panels facing inwards toward one another, and the heat sealable surfaces 44, 64 outward and in contact with a heat sealable surface 84 of the border strip 80 folded over the two edges, a single sealing action can be used to form two perimeter seals, as shown in FIG. 1C, a cross-section of the inflated balloon envelope 22.

Figure 3A:
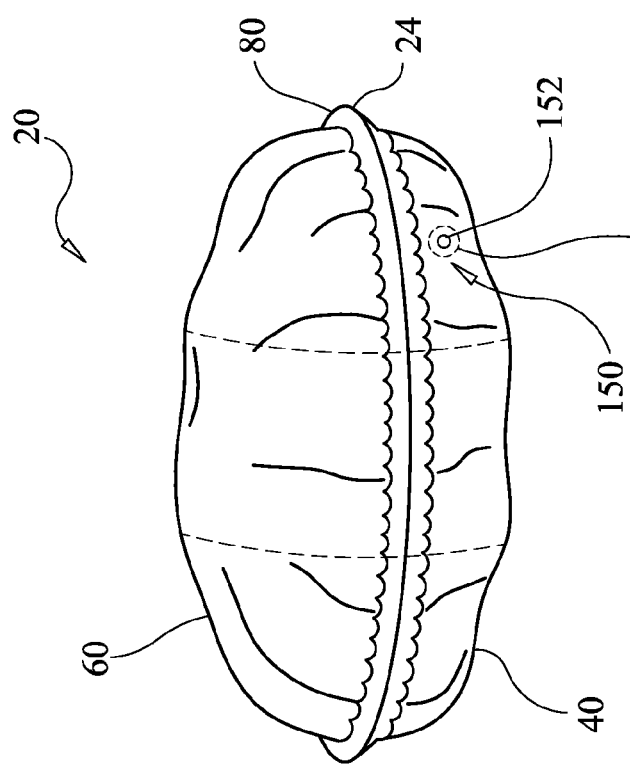
FIG. 3A shows a front perspective view of a slightly inflated high altitude balloon according to the present disclosure.

The first perimeter seal is formed by bonding the first panel 40 and the border strip 80, and the second perimeter seal is formed by bonding the second panel 60 and the border strip 80. Advantageously, even though in contact during the bonding process, the touching area between the first 40 and second 60 panels does not seal together as at least one of the panels has a non-heat sealable surface. When the balloon is slightly inflated, as shown in FIG. 3A, the balloon's border strip 80 begins to unfold as shown in FIG. 1C, exposing two circular perimeter seals 92, 94 (one butt seal or two lap seals) formed by a single perimeter sealing step. The two inner circular balloon panels inward facing surfaces 45, 65 do not seal to one another in a fin seal configuration because at least one of their surfaces is non-heat sealable.

Alternatively, if both sides of the first 40 or second 60 panels are heat sealable, the inward facing heat sealable side can be covered or coated with a buffer layer adjacent the curvilinear edge 43, 63 so that it prevents an interior seal (bonding) from being formed between the first panel 40 and the second panel 60.

There are many variations to the orientation of the first 40 and second 60 panels, the border strip 80, and their heat sealable 44, 64 and non-heat sealable surfaces 45, 65. It will become apparent to one skilled in the art that many variations are possible, particularly regarding combinations of two-sided heat sealable materials, one-sided heat sealable materials, and the use of additional adhesive and barrier layers. For example, as several combinations are shown in FIGS. 4B-4D.

Referring to FIG. 4B, the non-heat sealable surface 45, 65 of the first 40 and second 60 panels face outwards, away from one another, and the heat sealable surface 44, 64 sides face inwards and in contact with a heat sealable surface 84 of the border strip 80 folded between the two edges.

Referring to FIG. 4D, the heat-sealable 44, 64 and non-heat sealable surface 45, 65 sides of the first 40 and second 60 panels face the same direction. A two-sided heat sealable border strip 80 is folded between and over the panels so that the internal panel sealable surface of a first panel 40 and the external panel sealable surface of the second panel 60 are in contact with the border strip 80. Thus, a single sealing action can be used to form the two perimeter seals.

In all of the above examples, additional balloon film layers may be included such as barrier layers and/or adhesive layers. The embodiments herein describe film structures simplified for invention illustrative purposes and are not limited to the layer materials and configurations disclosed. For example, the balloon film orientation may also remain such as the traditional balloon film orientation whereby the non-heat sealable sides are facing outwards and the heat sealable sides are facing inwards.

The first 40 and second 60 panels can be formed from a roll or from rectangular material sections. Corners can be trimmed off to create two substantially circular shaped panels. The circular shaped panels may be made by a slitting blade, laser cutter, scissors, among many other cutting and trimming methods either before or during balloon envelope 22 manufacture.

Alternatively, other shaped material sections can be used to form the panels. For example, a substantially rectangular shaped border strip 80 can be folded over, or "wrapped" over the circular edge with its heat sealable sides facing the heat sealable tops and bottoms of the two circular panels. With one perimeter seal, the top folded half of the border is sealed to the outside of the top circular panel, and the bottom folded half of the border is sealed to the outside of the bottom circular panel.

The border strip 80 used in many of the aforementioned balloon embodiments may be comprised of a balloon film material much like the material used for the circular panels. This is not necessary, however, as many alternative materials and border configurations may be used which would be obvious to one skilled in the art. A laminated fabric, either woven or non-woven, and a plastic living hinge strip can all be used as effective borders. Such border strips 80 would be allowed to freely bend back and forth while maintaining their strength and structural integrity. Zipper technologies, much like those seen on plastic zipper bags, may be used as a border if such a balloon or inflatable were required to be re-openable/re-closable. Additional female/male, channel, and other mechanical fastening alternatives exist that can be incorporated into a border strip 80. Ropes, tubes, plastic straps, among other possibilities exist for the border strips 80. The circular panels are likewise open to any variation in material layers and shaped configurations that may be deemed appropriate for a given embodiment of the present invention.

Comparing the seal shown in FIG. 1C and the prior art seal shown in FIG. 2B, upon substantial inflation or inflation to a positive pressure, a tension force directed toward the two poles tends to peel the circumferential seal apart as applied to the prior art fin seal shown in FIG. 2. In contrast, a sheering force is applied to the seals of FIG. 1C formed according to the present invention. Such material seals are stronger in sheer than in a fin seal configuration, thus the seals shown in FIG. 1C and according to the present disclosure are stronger upon substantial inflation and positive balloon internal pressure.

The present embodiments of the high altitude balloon 20 are not limited to commercially available widths of suitable balloon films. FIG. 3A illustrates an embodiment of a high altitude balloon 20 requiring a first 40 and second 60 panel that are each wider than commercially available films. According to the illustrated embodiment, three rolls of film are simultaneously unrolled and spliced together into a wider film web by means of two 2-side heat sealable splicing tapes butt sealed over one or both sides of the film seal joints. There are many joining techniques, seam types, sealing machines, etc. that can be used from this specification as well as those known in the art for splicing and converting narrower webs into wider webs. Some of the splice sealing machines are continuous rotary sealing machines, and others are intermittent indexing sealing machines.

Small pieces of non-heat sealable tape can easily be placed on the inner side of the spliced circular panels, where the perimeter seal is to take place, to keep the two inside panels from inadvertently sealing together if the two side heat seal splicing tape's surfaces are exposed between the two panels' abutting edges. This splice joint material may be made of the same material as the rest of the balloon or may be made of a different material. Such splicing may be completed on a per balloon basis, or completed in a continuous converting fashion whereby a new large web is rewound on a wide roll core for storage and later dispensing. Various other methods to splice together wider balloon material webs are possible and vary depending upon the materials and widths required. Balloon panels 40, 60 and border strip 80 may be made up from any subcomponent size, shape, and material. For example, embodiments may include one or more parts made from gores. For example, one embodiment of a balloon may consist of a first panel 40 and a second panel 60, where none of these are made from gores. However, it is possible for one or more of these parts to be made from gores. For example, one balloon embodiment may be formed from a first panel 40 without gores, and a second panel 60 without gores. A second balloon embodiment may be formed from a first panel 40 without gores, and a second panel 60 made from gores. A third balloon embodiment may be formed from a first panel 40 made from gores, and a second panel 60 made from gores. Thus, it is possible to form balloon embodiments by combining one or more goreless pieces with one or more pieces made from gores. This is in contrast to prior balloons which are made entirely from gores.

Figure 3B:
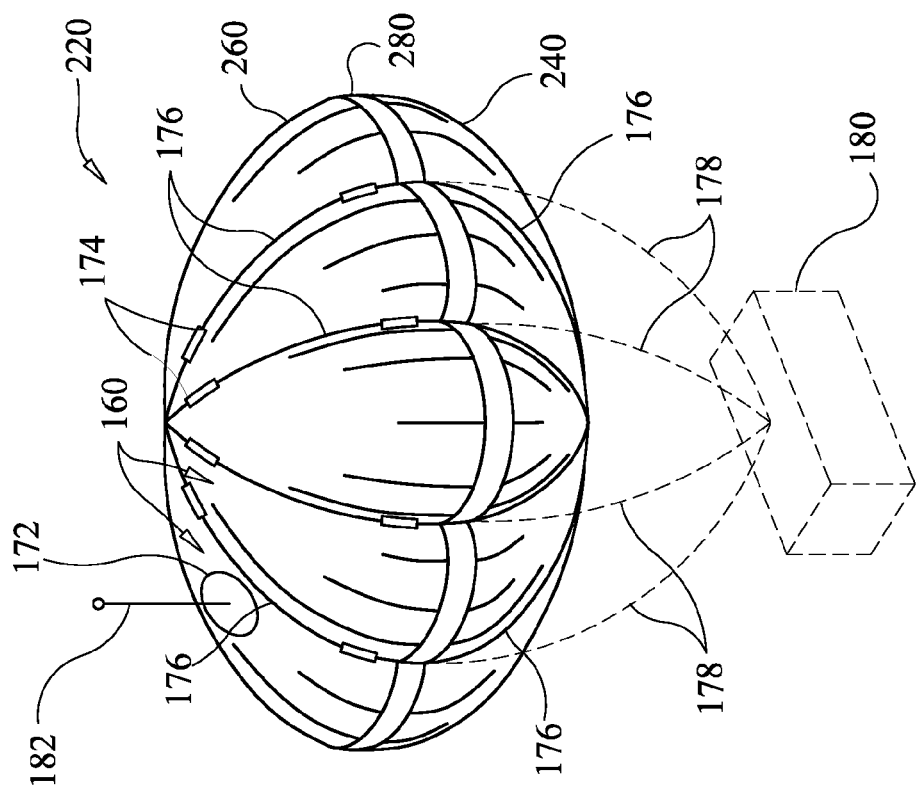
FIG. 3B shows a front perspective view of an inflated high altitude balloon with optional load and restraint lines according to the present disclosure.

In one embodiment of a high altitude balloon 20 of the present invention, load and/or restraint lines 178 may be added to carry a payload and/or form lobes on the surface of the balloon as illustrated in FIG. 3B. Such balloon lobes 160 are well known in the art to reduce the loads on balloon panels by reducing the local radiuses of film curvature. Many materials can be used for load and/or restraint lines 178, including but not limited to Kevlar line, rope, polyester twine, etc. The load and/or restraint lines 178 may be independent, such that they are not structurally connected to any of the other lines, or they may be interlinked by some fashion with the other lines. Load and/or restraint line circles may be mass produced by coupling the two ends of a line by braiding, tying, mechanically fastening, or melting together, among many other methods. To create lobes from a circular restraint line circle, the circular line circumference can be less than the balloon circumference (roughly double the flat circle panel diameter), and the load lines may be equal to, or even longer than the balloon circumference, particularly if the balloon film is expected to stretch when pressurized. Such load line circles may be positioned around the balloon by use of tabs, tape, loops, channels, among many other securing methods.

Figure 5A:
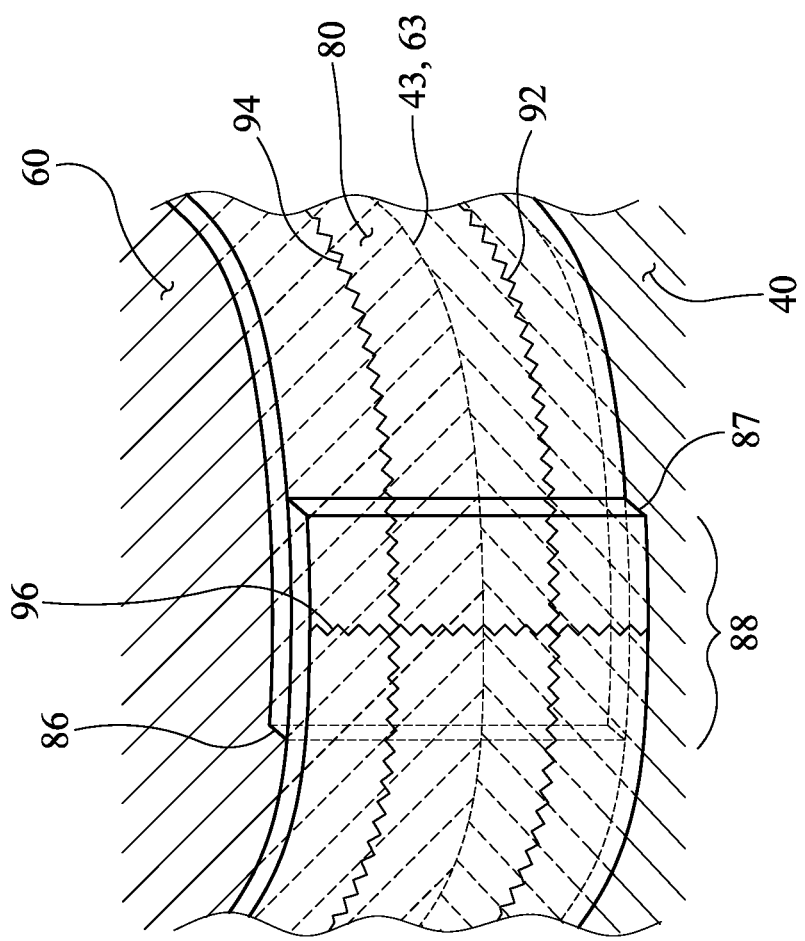
FIG. 5A shows a front perspective view of an overlap termination hermetic sealed border strip associated with the present disclosure.

In one embodiment of the present invention, a perpendicular termination seal 96 is used to join the lead end 86 and tail end 87 of the border strip 80, as shown in FIG. 5A. When the border strip 80 is folded over the panel perimeters and bonded to the circular panel outer surfaces, it must curve and travel at least 360 degrees around the circular panels to finish the perimeter seal 94. The point where the two ends of the border meet may be sealed without the need of an additional termination seal 96 perpendicular to the two parallel peripheral seals 92, 94; however, the final termination seal 96 closes a leak path between the overlapped layers of the lead end 86 and tail end 87 of the border strip 80 between the two peripheral seals 92, 94. It should be noted that no perpendicular termination seal 96 would be necessary if the perimeter seals 92, 94 are completed all the way out to the folded edge of the border strip 80, thus creating what would resemble one double-wide perimeter seal rather than two narrower perimeter seals.

The termination seal 96 thus can provide a hermetic seal 90 to the balloon envelope 22. To use an end termination seal 96 as illustrated in FIG. 5A, a border strip 80 with both side surfaces being heat sealable 84 can be used so that the lead end 86 and tail end 87 that overlap can be sealed together across the two peripheral seals 92, 94.

Figure 5B:
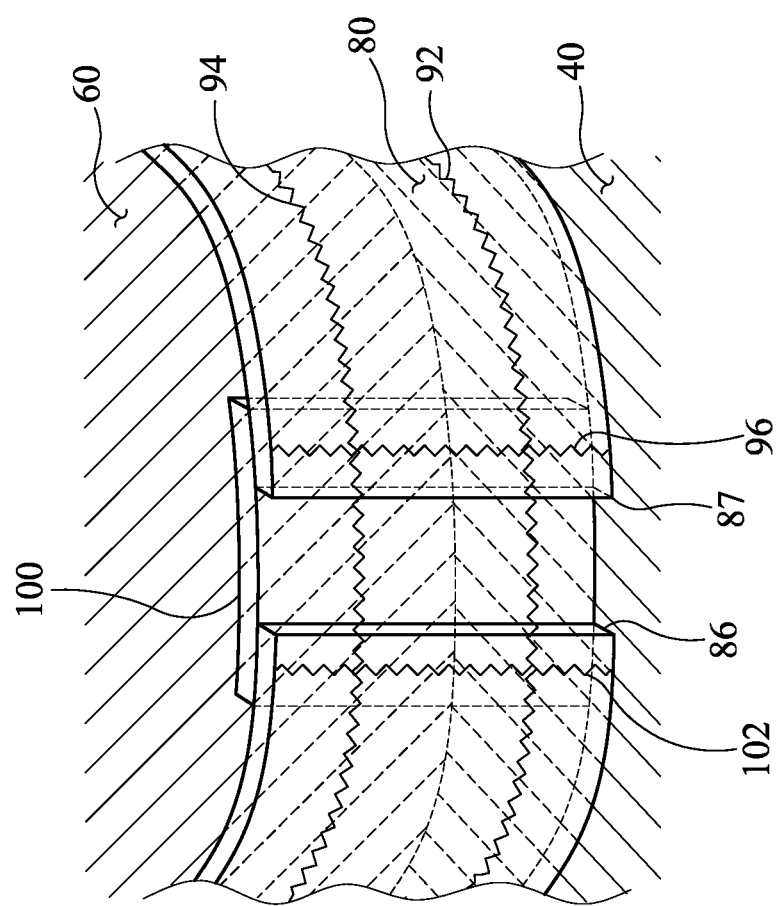
FIG. 5B shows a front perspective view of a union joint termination hermetic sealed border strip associated with the present disclosure.

Alternatively, if the border strip 80 used only has one side surface that is heat sealable 84, FIG. 5B illustrates how a two-side heat sealable union joint 102 (i.e. border strip extension tab) may be used to provide the final hermetic termination seal 96. The union joint tab may be sealed to both of the inner facing surfaces of the border ends, sealed to both of the outer facing surfaces of the border ends, or to one inside facing and one outer facing surfaces of the border ends. The union joint section 100 can be lap sealed 102 to an end of the border strip 80, for example, the lead 86 or tail end 87 before starting the perimeter bonding process. In other terms, the union joint section 100 of border strip 80 allows the tail end 87 of the border strip 80 to overlap and seal to the lead end 86 of the border strip 80 even though the main border strip's 80 outward facing side is traditionally non-heat sealable. Regardless of using the sealing methods illustrated in FIG. 5A or 5B, an alternative end-termination seal 96 is illustrated to complete the balloon's hermetic seal 96. The termination seal 96 can be made using a RF and/or impulse stamp sealer, among from a host of other thermoplastic sealing machines.

In an alternative embodiment of a balloon according to the present disclosure, a high altitude balloon 20 has both heat sealable inner and outer surfaces, such as with a polyethylene balloon film. As previously described, such a balloon may be pre-treated with a non-heat sealable tape or other layer or coating (such as PET, silicone or polyurethane) around the inside sealing perimeter to allow the two circular panels to separate upon inflation. The balloon's inside heat sealable nature makes performing a final termination seal 96 as shown in FIGS. 5A and 5B more difficult. In the before-mentioned case, the inner balloon surfaces beyond the original sealing perimeter would also be heat sealable and may have a non-heat sealable patch 172 inserted somewhere within to protect for the end termination seal 96, or a non-heat sealable "arch tab" may be inserted that extends from the top of one circular panel to the top of the second circular panel. The arch tab extends over the facing heat sealable surfaces of the border 80 so that portions of the border 80 are prevented from sealing upon themselves.

Figure 6:
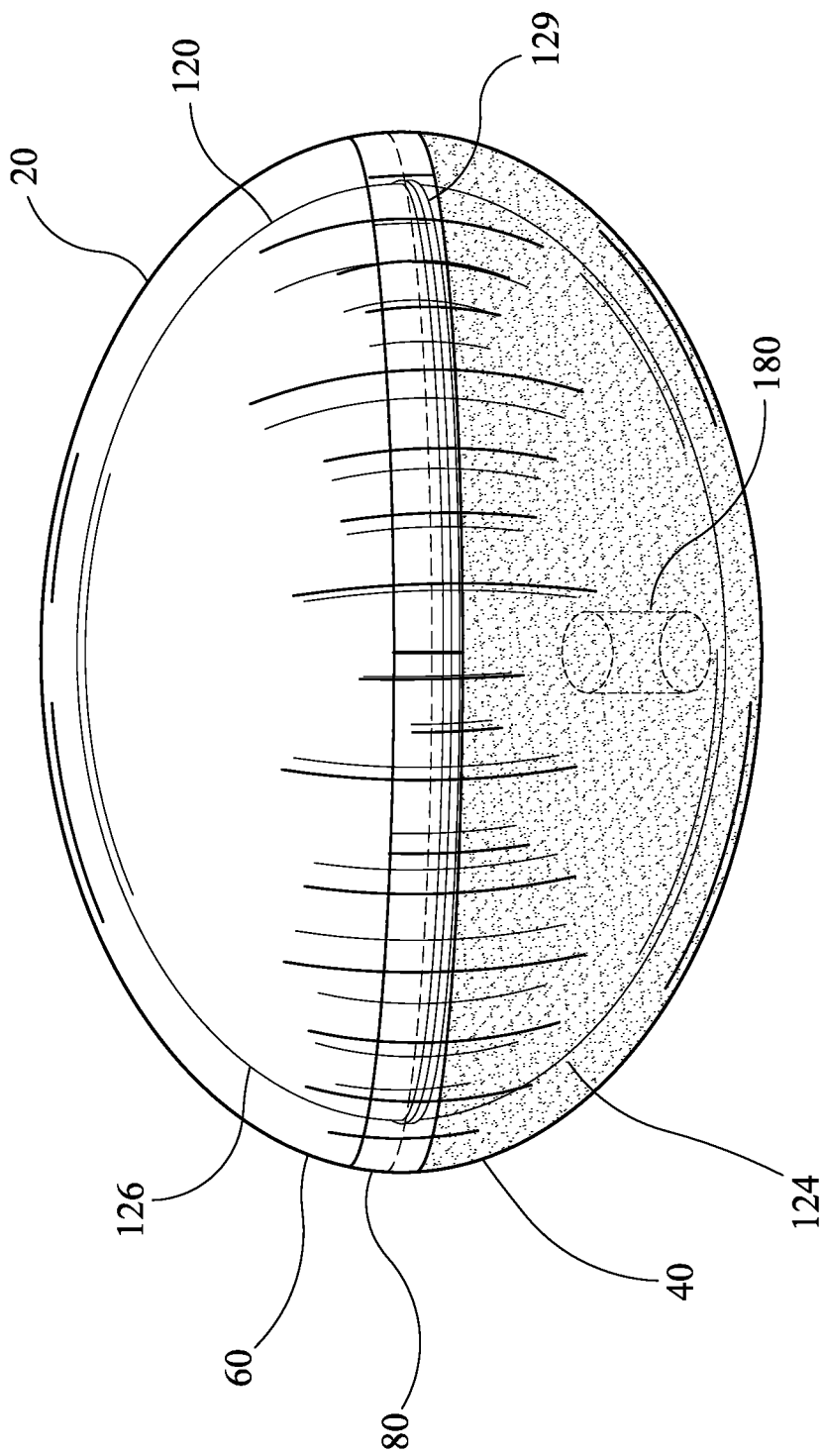
FIG. 6 shows a front perspective view of an inflated balloon with an internal balloon or bladder associated with a high altitude balloon according to the present disclosure.

In an alternative embodiment of a balloon according to the present disclosure, as shown in FIG. 6, a balloon 120 can be placed within a balloon 20, or a ballast chamber ballonet 120 placed within an external balloon shell envelope 20. Referring to FIG. 4C, illustrating a configuration for simultaneously positioning and sealing closed a balloon 120 within a balloon 20, that is to say simultaneously sealing closed one outer balloon 20 that envelops an inner balloon 120, the non-heat sealable surface 45, 65 sides of the outer balloon's first 40 and second 60 panels face inwards toward the outward facing non-heat sealable surfaces 123 of the inner balloon panels, and the heat sealable surfaces 44, 64 of the outer balloon 22 face outwards and in contact with a heat sealable surface 44, 64 of the border strip 80 folded over the two edges. Thus the sealing configuration of the outer balloon 22 is equivalent to the sealing configuration illustrated in FIG. 4A. Because the inner balloon's 120 heat sealable surfaces are facing one another, a fin seal balloon 10 as illustrated in FIGS. 2A and 2B is created when a bonding device is applied adjacent the panel perimeters. Thus a single sealing action can be used to form two perimeter seals 92, 94 of the outer balloon 22 and one fin seal 129 of the inner balloon 120. Although the inner balloon's 120 fin seal 129 is not as strong as the outer balloon's butt or lap seal 92, 94, the inner balloon 120 may not be subjected to the same pressures as the outer balloon 20 and it can be advantageous to form internal balloons, bladders, or ballonets 120 in a simultaneous manner with the outer balloon 20 rather than fabricating inner and outer balloons apart from one another and having to stuff one inside the other. It is becoming an industry standard to adjust balloon altitudes, and thereby adjust balloon flight direction, by way of a gas ballast control. Thus it is an advantage of the present invention to simultaneously position and seal together a balloon 120 within a balloon 20, or a ballast chamber ballonet 120 within an external balloon shell 20.

An optional internal payload 180, as illustrated in FIG. 6, can also be placed between the panels 40, 60 prior to sealing the perimeter or prior to performing the termination seal 96. Such a payload 180 can also act as a means for backing mechanical pressure during assembly, can be attached to a balloon section prior to assembly, or can be attached to a balloon section during assembly.

The first perimeter seal 92 is formed between the first panel 40 and the border strip 80, and the second perimeter seal 94 is formed between the second panel 60 and the border strip 80. Advantageously, even though in contact during sealing, the inner facing seal surfaces between the first 40 and second 60 panels do not bond and seal together as these inner surfaces are not heat sealable. The heat-sealable 44, 64 and non-heat sealable 45, 65 surfaces of the first 40 and second 60 panels face the same outer direction. A two-sided heat sealable border strip 80 is folded between or over the panels 40, 60 so that the internal panel sealable surface of a first panel 40 and the external panel sealable surface of the second panel 60 are in contact with the border strip 80. Thus, a single sealing action can be used to form the two perimeter seals 92, 94.

A particular embodiment of this balloon consists of a two panel balloon with a sheer-seal curved bordering, containing a more traditional two panel fin sealed balloon 10 within it. Unlike with the outside balloon 22, a fin seal 129 configuration can be utilized on the inside balloon 120 since it does not need to withstand as high of pressures as the outside balloon envelope 20. In a particular embodiment, the mating faces of the inner balloon panels 122 seal together while leaving the inner balloon's exterior facing surfaces non-heat sealable 123. The outer balloon 20 may also have non-heat sealable inner facing surfaces and thus will not stick to the exterior facing surfaces of the inner balloon 120. It should be noted that only one of two facing surfaces need be non-heat sealable in order to prevent the two layers from bonding together. A sheer-sealed curved border strip 80 is used to seal up the outer balloon's perimeter edge 24, encapsulating the inner balloon 120.

Current state of the art high altitude balloons 20 are generally constructed on long rectangular tables on which a plurality of gores are sealed to one another with 2-3 people walking up and down the tables in film preparation/stretching, sealing, and/or seal inspection roles. This manual process of manufacturing high altitude balloons 20 has proven very difficult to scale up into high volumes and ensure consistency and reliability. Embodiments of the present disclosure are generally directed toward methods and apparatus for manufacturing a mass producible high altitude balloon 20, thus overcoming labor intensive steps which will lower manufacturing costs and greatly improve seal quality and balloon float consistency.

Figure 7:
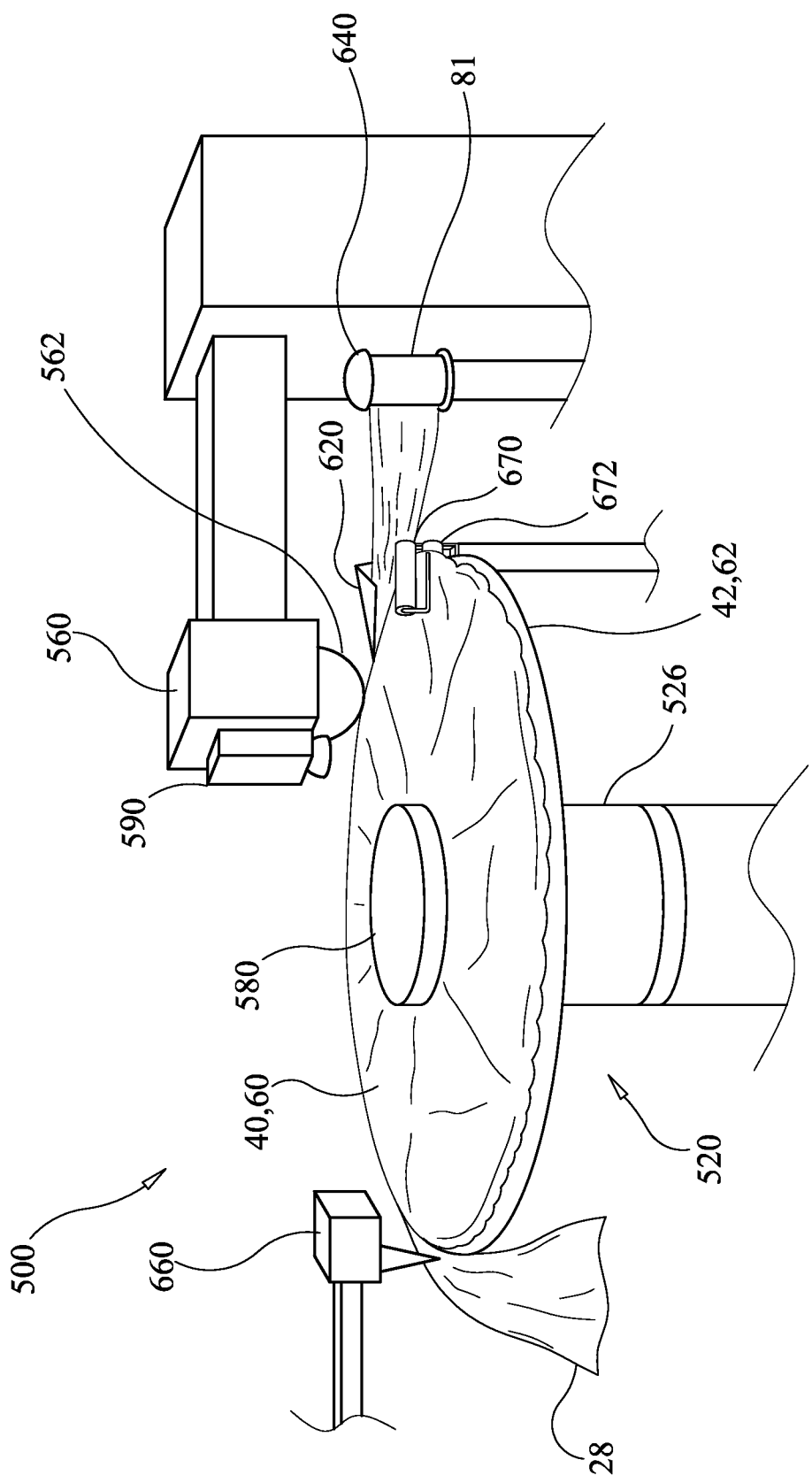
FIG. 7 shows a front perspective view of an apparatus for manufacturing a high altitude balloon according to the present disclosure.
Figure 9:
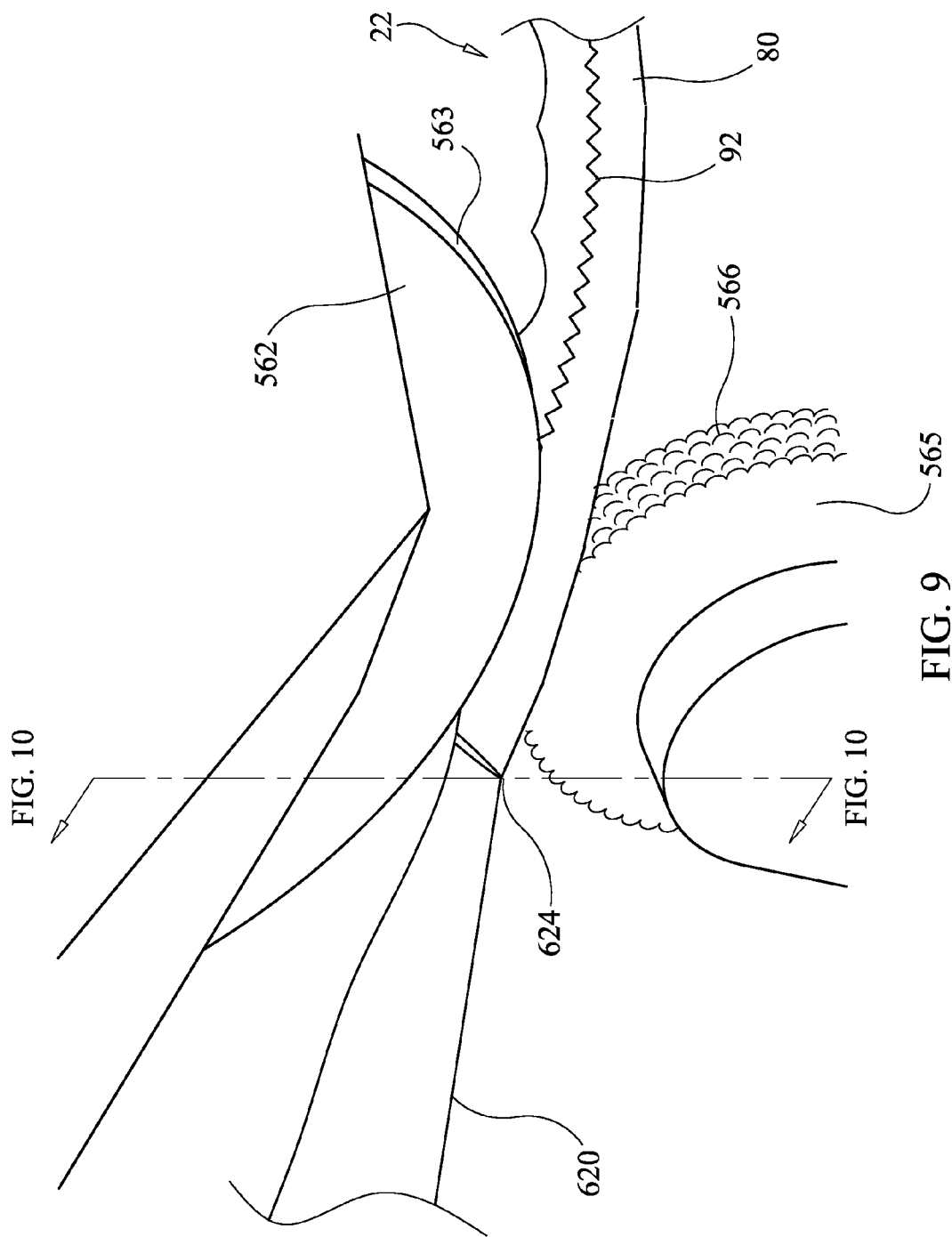
FIG. 9 shows an enlarged view of a guiding device, bonding, and motion device of the apparatus of FIG. 7 forming the perimeter seals and curved border strip.
Figure 10:
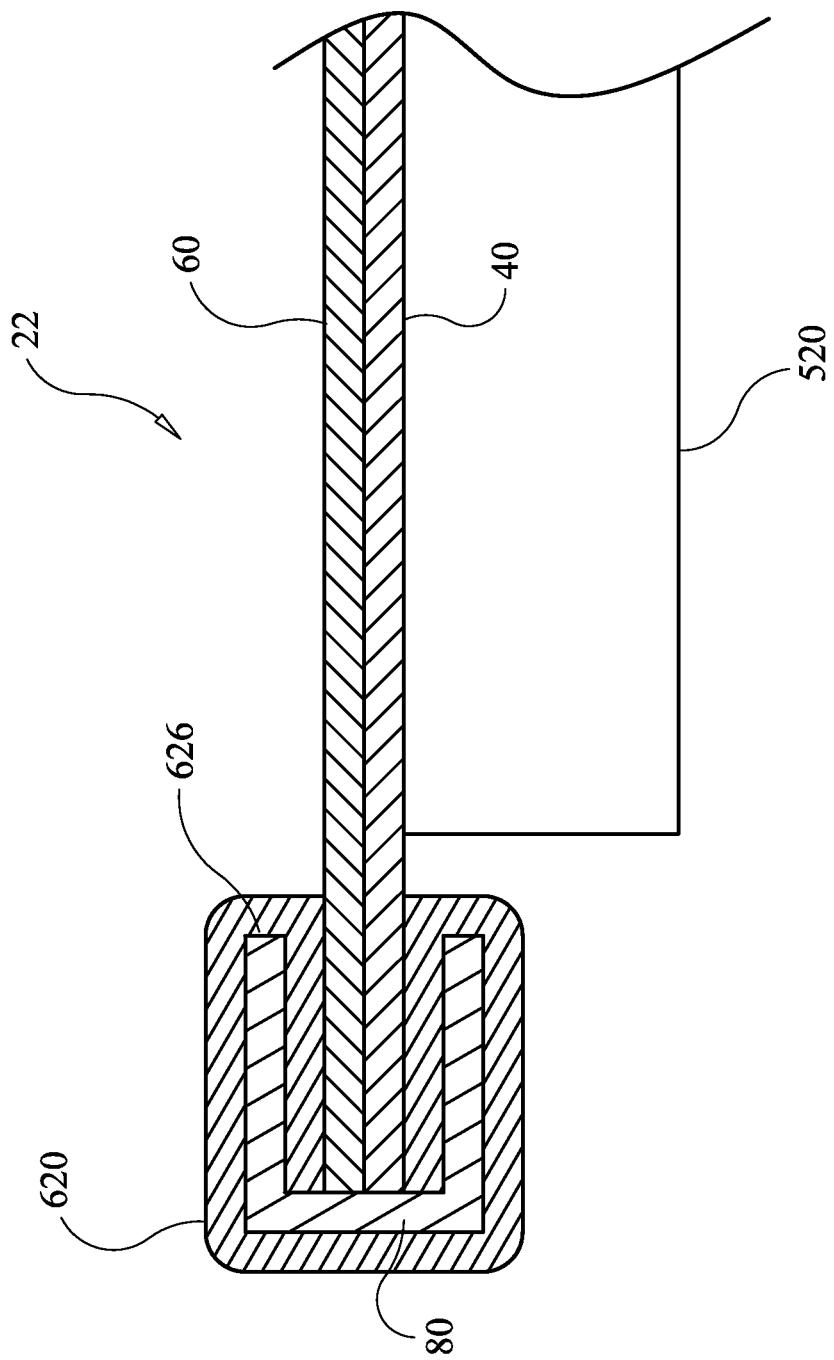
FIG. 10 shows a cross-section view of a guiding device, support device and balloon envelope of FIG. 7.
Figure 11:
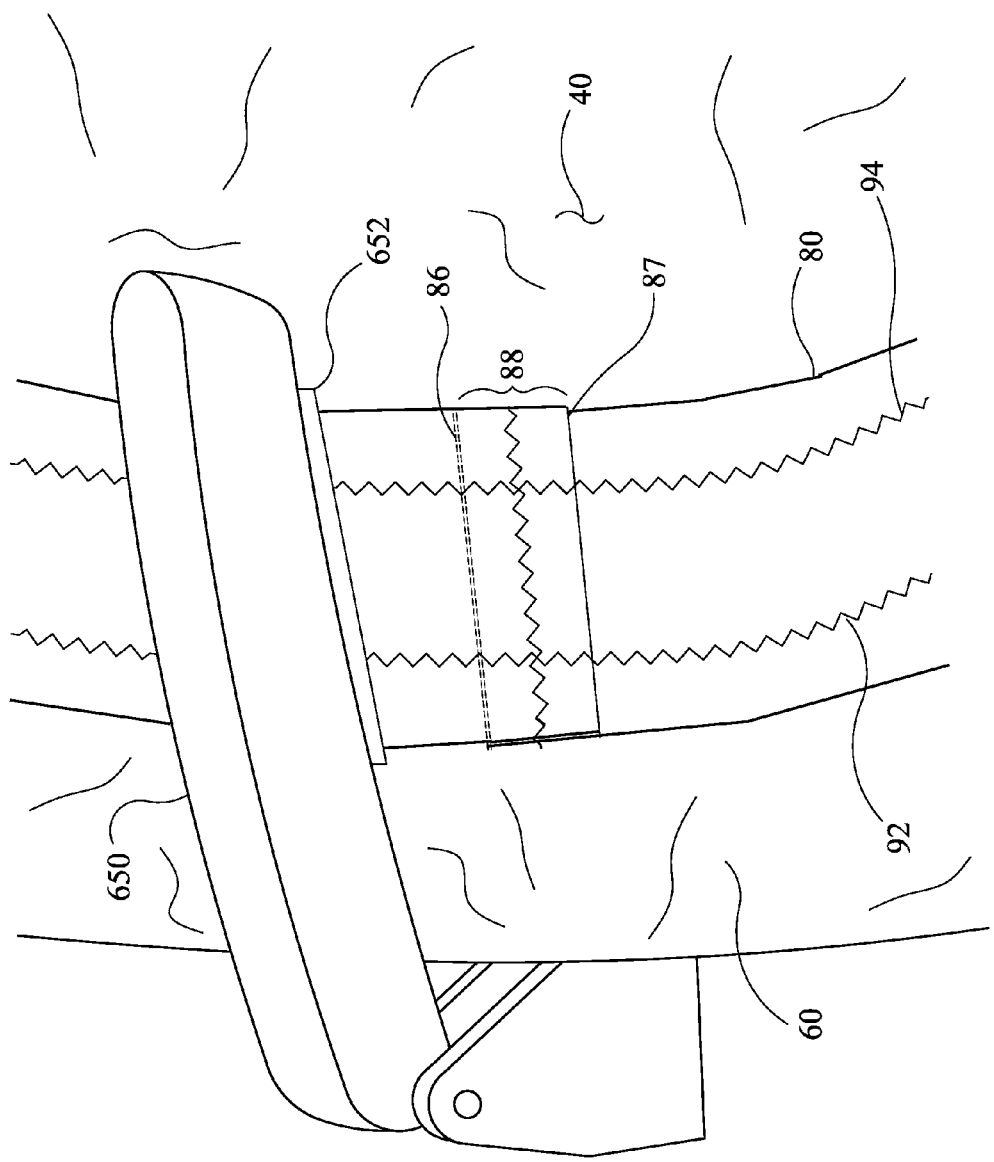
FIG. 11 shows a closure device forming a termination seal associated with the present disclosure.

FIGS. 7-14 illustrate an embodiment of an apparatus 500 for manufacturing high altitude balloons 20, including but not limited to zero pressure and superpressure high altitude balloons. Referring to FIG. 7, an apparatus includes a balloon panel support device 520, a balloon panel securing device 580, a border dispenser 640, a bonding (sealing) device 560, a motion device 540, a balloon panel trimmer 660, an inspection camera 590, and a closure device 650 (FIG. 11).

The support device 520, for example, a circular table, supports the first 40 and second 60 balloon panels in a substantially flat, overlaid position as shown in FIG. 7, for example, with the second panel 60 overlaying the first panel 40. The balloon panels sections 40, 60 can be dispensed manually or by way of nip rollers 670, 672 from a stack, continuous master roll(s), or other automated web or sheet dispensing device (not shown) known in the art. An automatic sliding knife (not shown) can cut the panels 40, 60 from a continuous roll when properly extended into place. Alternatively or additionally, the panels 40, 60 may also be mass-trimmed into their appropriate shape with a laser cutter or other trimming device.

As disclosed above, one embodiment overlays balloon panels 40, 60 on the support device 520 with their heat sealable surfaces 44, 64 facing outward and the non-heat sealable surfaces 45, 65 facing inwards, toward one another. The securing device 580 applies mechanical pressure to hold the first 40 and second 60 panels about a central axis 610 of the support device 520. For example, a center weight 580 as shown in FIG. 7 can be used to hold the panels 40, 60 in position. Optionally, a panel protection pad (not shown) may be placed on top of the panels 40, 60 before placement of the weight 580. Alternatively, the weight 580 may have a protection pad incorporated into its design as to not cause any abrasion to the film surface of the panels 40, 60.

With the weight 580 in place, the trimming device 660 in conjunction with an optional nip roller pair 670, 672, can be moved relative to the perimeter 24 of the balloon panels 40, 60 to trim off excess material 28 and to provide the desired panel shape, for example, a substantially circular panel shape. The support device 520 may be rotationally driven or the trimming device 660 translated rotationally around the support device 520 to provide the desired motion relative to the perimeter 24 of the trimmed balloon panels 40, 60. The trimming device 660 may be a slitter blade, laser cutter, or other cutting device.

Rather than using a weight 580 for the securing device 580, the panels 40, 60 can alternatively be held in place by adhesives, vacuum systems, magnets, weights arranged at locations other than in the center 26 of the panels 40, 60, as well as methods and devices for securing known in the art. In one embodiment, no securing device is employed, for example if a table 520 is driven at a speed and direction that matches the sealing speed and direction, thereby creating no substantial lateral stresses on the panels 40, 60 that require fixing them in place.

It should be noted that the table 520 or other support device 520 need not be circular. The support device 520 may also be rectangular, triangular, regular or irregular shaped, among other possible shape configurations. Nor does the support device 520 need to be flat. It may be dished, wavy, meshed, among any other regular or irregular surface configurations. Additionally, in the illustrative embodiment table 520 freely rotates on a rotary bearing, for example, a free spinning Lazy Susan or other 360 degree bearing system. In alternative embodiments the table 520 or other support device 520 may include a motor, axle, gears, or other drive system to rotate the table surface 520 relative to a bonding device 560.

Figure 8:
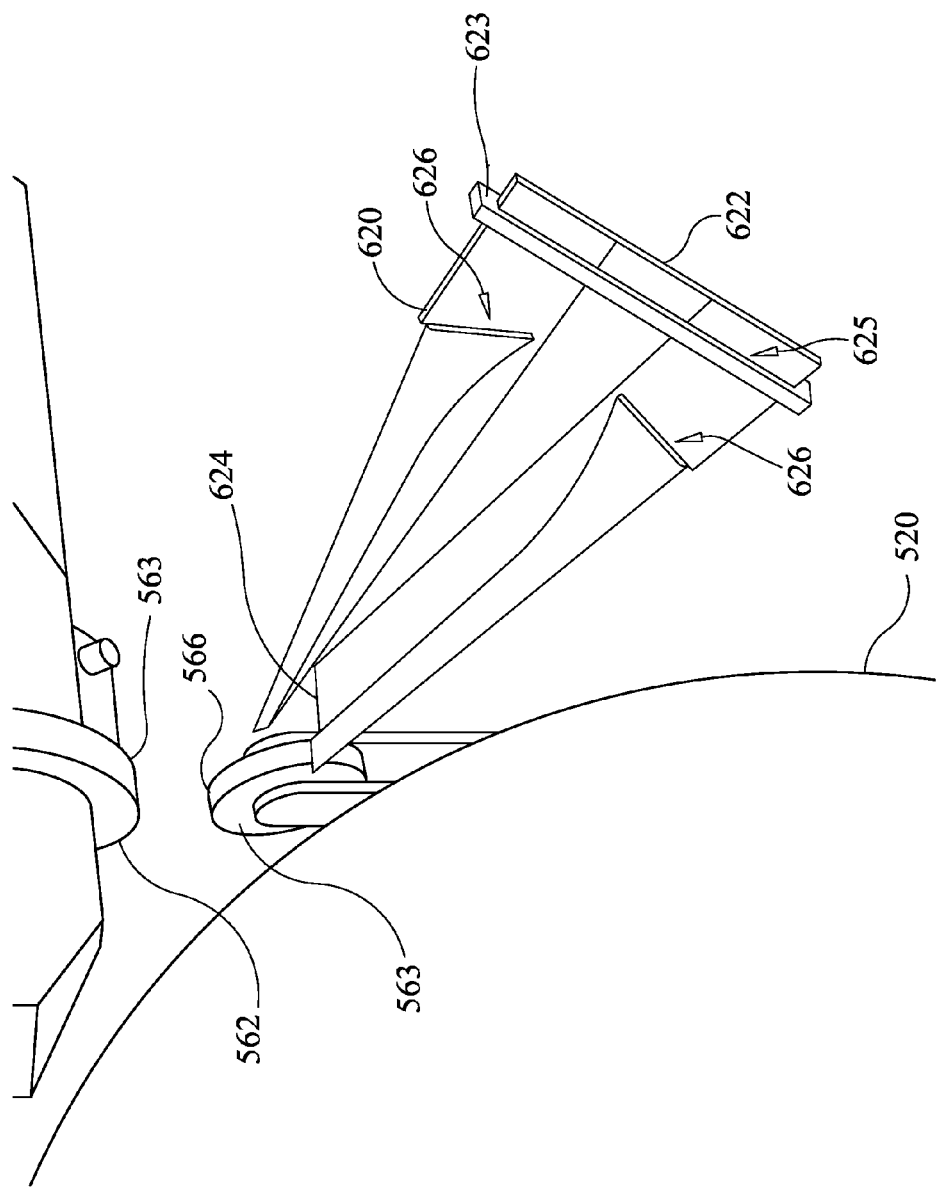
FIG. 8 shows a guiding device and bonding device of the apparatus of FIG. 7.

A two-side heat sealable border strip 80 may be dispensed and guided relative to the curvilinear edges 43, 63 of the panels 40, 60. For example, in the embodiment shown in FIGS. 7-10, the border strip 80 is dispensed from a continuous roll 81 and guided through a guiding device 620. In this embodiment, the guiding device 620 includes a pair of channels 626 oriented to receive and guide respective edge portions of the border strip 80, and as shown in FIGS. 8 and 9, the channels 626 curvilineal extending toward each other along the length of the guiding device 620 to a substantially parallel stacked position at the exit end 624 of the guide so as to fold respective edges of the border strip 80, for example, over a top side and a bottom side of the at least first 40 and second 60 balloon panels as shown in the cross-sectional view of FIG. 10. The guiding device 620 thus positions the border strip 80 relative to the curvilinear edges 43, 63 of the first 40 and second 60 panels so that they may be bonded, i.e., forming the first and second perimeter seals 92, 94 between the border strip 80 and the first 40 and second 60 balloon sections, as shown in FIG. 1C.

The guiding device 620 ensures that the positioning of the border strip 80 remains consistent during the material feeding and sealing process. The guiding device 620 gently folds the border strip 80 in half while allowing the circular panels 40, 60 to enter in between the folded border portions before all layers pass together through the appropriate sealing apparatus 560. High altitude balloon 20 manufacture has a much lower tolerance for error than the manufacture of other types of balloons or inflatables. The balloon panels 40, 60 and border strips 80 are lightweight and can easily flex and crease. Their flexible nature makes consistent material guiding a painstaking and human error-filled process. Moreover, the advent of new super-thin materials, such as graphene and others, will enable balloon films to be even thinner in the future and will make manual handling even more complex. The use of a guiding device 620 positioned relative to the sealing apparatus 560 addresses these manufacturing challenges. Because of new ultra-high tensile strength balloon materials being developed and soon to be commercialized, it is also imperative that the seal configurations be as strong as possible. The current disclosure allows for the use of lap seals, butt-seals, and double butt-seals (inside and outside butt seals) among other strong sealing possibilities. Many guiding device 620 sizes and shapes are possible, and custom molds may be devised to match the combination and stack order of the circular panels 40, 60 and border strips 80, as may be desired.

In the present embodiment illustrated in FIGS. 9 and 10, as the border strip 80 and edges of the circular panel 40, 60 are properly brought into a mated position using the guiding device 620, these layers are fed out of the exit end 624 of the guiding device 620 and into a bonding device 560. In the illustrative embodiment, the bonding device 560 is an ultrasonic rotary sealer, the rotary wheels 562, 565 of which also serve to apply a lateral force 600 on the border strip 80 and outer perimeter of the panels 40, 60 that pulls the balloon panels 40, 60 and the table 520 with them in a circular direction, as well as pulling through the border strip 80 from a continuous roll 81 through the guiding device 620. As the four layers are guided between the rotary wheels 562, 565, the bonding device 560 simultaneously seals all layers, forming the above disclosed first 92 and second perimeter 94 seals and further curves and forms the border strip 80 to follow the curvilinear edges 43, 63 of the perimeter of the circular panels 40, 60, for example, by gathering the border strip 80 along the edges overlapping the panels, or stretching the outer folded peripheral edge of the border strip 80, or both. As previously discussed, because at least one of the inward facing circular panel surfaces are non-heat sealable, the top border strip 80 half will seal to the top (second) panel 60 and the bottom border strip 80 half will seal to the bottom (first) panel 40. The two circular panels 40, 60 will not seal to one another and will cleanly separate upon inflation of the balloon 20, as shown in FIG. 1C.

In the present embodiment 20, the rotary wheels 562, 565 of the bonding device 560 drive the balloon envelope 22 rotationally around a full perimeter 24 (substantially 360 degrees). For example, the rotary wheels 562, 565 can translate the full perimeter 24 of the balloon panels 40, 60 to provide the perimeter seals 92, 94. The rotary wheels 562, 565 can further translate along the perimeter 24 an additional small rotational distance to allow for the tail end 87 of the border strip 80 to overlay the lead end 86 and continue the perimeter seal in the overlaid section 88, for example, as shown in FIG. 5A. The border strip end 87 can then be trimmed and a final hermetic termination seal 96 made, for example, using a closure device 650 such as an impulse sealer as shown in FIG. 11. The final termination seal 96 can be completed either before or after lifting the center weight 580 to remove the finished balloon 20.

Though there may be additional desired steps to complete the balloon 20, such as the addition of valves, fittings, load/restraint lines, and/or inspecting seals with cameras, the steps of manufacture of a high altitude balloon 20 using the apparatus shown in FIGS. 7-10 are complete.

By computer controlling the apparatus 500 and associated manufacturing steps, a continuous production of high altitude balloons 20 may be made until the material roll dispensers 640 for the balloon panels 40, 60 and/or border strips rolls 81 need to be refilled. Balloons 20 may be automatically removed from the table 520 and conveyed away or stacked for storage either before or after the final termination seal 96 is performed, either manually or through automation.

Figure 16:
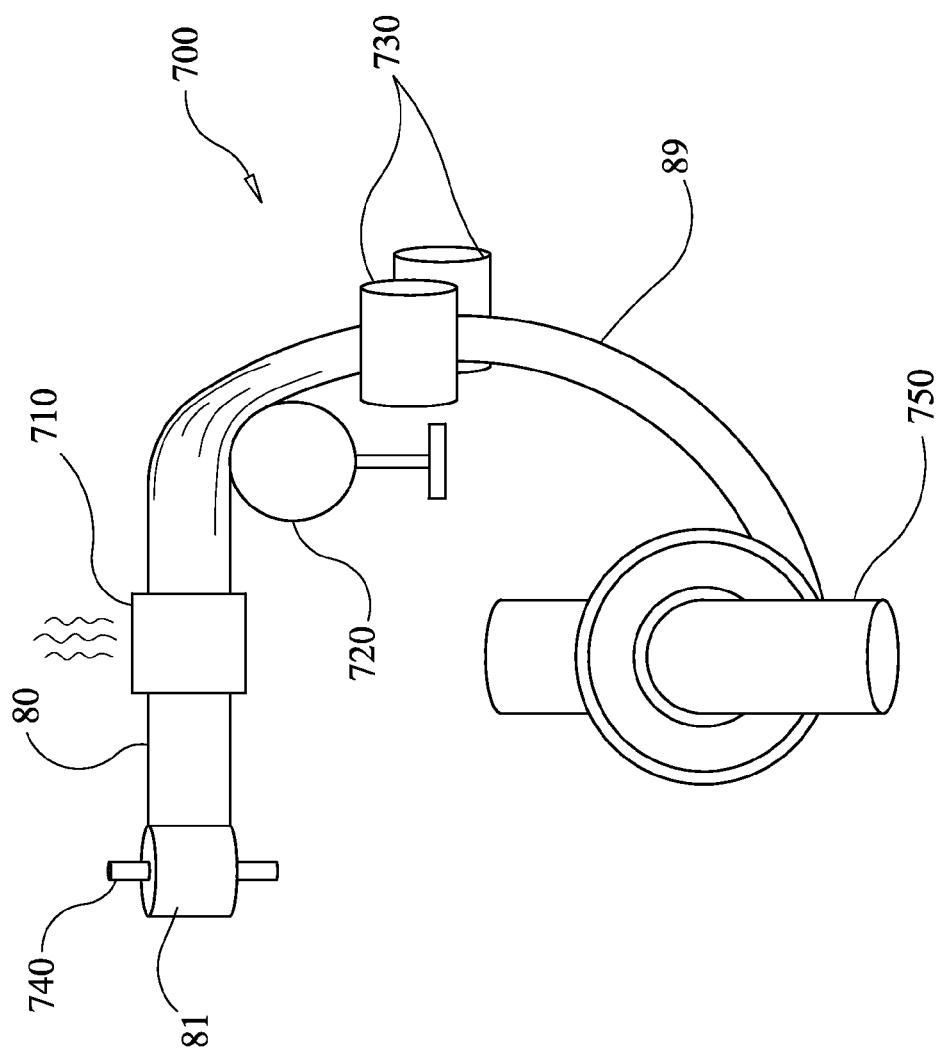
FIG. 16 shows an illustrative process apparatus associated with stretching a border strip material over a mold to create a pre-curved border strip according to the present disclosure.

As illustrated in FIG. 16, a flat processed film 80 may be heated in an oven 710 of sorts, if necessary, and manipulated through rollers or dies 720 to stretch into a required curved shape. Furthermore, an embodiment pulls a flat film 80 over a substantially rounded die 720 to cold stretch out the middle of the film 80, and thereby creating a curved bordering 89. By maintaining a constant pull speed and tension over a mold, a curved film can be obtained which retains most of its original strength and can be rewound on a curved surface roll core 750 for ease of storage and dispensing. In other embodiments, a curved border may be extruded, or an injection die mold may inject a molten substrate into a curved die, to take on the curved shape of the panel perimeters.

Pre-curved borders may be used with indexing stamp sealers or continuous rotary sealers, among many other sealing methods available. A thick straight bordering, for example, may introduce wrinkles to the seal weld if tried to match the curve of the circular film perimeter; however, if pre-curved it may now be used and offer great strength advantage over the thinner border strip alternatives that do not require pre-curving. Either curving while sealing or pre-curving and afterwards sealing falls within the spirit of the present invention.

Many curve appropriate sealing options are available for the bonding device 560 and/or closure device 650, including, for example, but not limited to RF, laser, impulse, band sealing, ultrasonic, adhesive, and hot wheel. When the finished balloon 20 is inflated, for example, as shown in FIGS. 1A, 3A, and 3B, the folded border strip 80 will open up and show itself as a butt welded perimeter seal (two lap seals) 92, 94, as shown in FIG. 1C, with strong pressure resistance suitable for long-duration flight.

Depending upon the border strip 80 used and the tightness of the seal curve radius, a consistent ruffling or waving of the border strip 80 may be safely created by the heat sealing step to help the border curve around the circular perimeter 24. It is important to ensure that excessive border curvature waving and distorting does not introduce failure-prone wrinkles into the newly created perimeter seals 92, 94. Material types and thicknesses, perimeter curvature angles, among other parameters must be taken into consideration when determining the proper conditions to achieve a suitable seal to manufacture a high altitude balloon 20 in the present embodiment. However, once the proper positioning and bonding parameters are established, the present invention allows for these parameters to become fixed and recreated on a consistent and reliable basis.

In an embodiment of the present invention, it may be desirable to attach a host of load/restraint lines 176, load line loops 174, tabs, valves and/or fittings to the front or back of the border strip 80 before it passes through the guiding device 620. Similarly, the rolls for the circular panel films 40, 60 may also be so pre-processed to complete this step before the balloon perimeter sealing 92, 94 step.

In an embodiment of the present invention, the border strip 80 may have a pre-creased center line to ensure that it folds exactly in half, though this crease is not necessary. The guiding device 620 tapers the border strip 80 to fold it in half and sandwiches the circular panel perimeter edges 40, 60 in between the border strip 80 halves. As the 4 gathered layers of the border strip 80 and circular panels 40,60 exit the guiding device "exit tip" 624, they may be pinched together and driven forward by means of one or more pinch (nip) rollers 670, 672 and/or bonding rollers 670, 672. The present invention allows for a host of alternative pinch rollers and sealers, sealing rollers, flat and curved sealing machines, continuously rotating and indexing machines, and/or any other possible configurations of web handling and sealing combinations to achieve variants of the high altitude balloon 20 of the present invention. It should be noted that regardless of the web handling and sealing mechanisms chosen, an embodiment of the present invention allows the border strip 80 to simultaneously seal to the perimeters of both the top 40 and bottom 60 circular panels 92, 94 in one pass.

Figure 17:
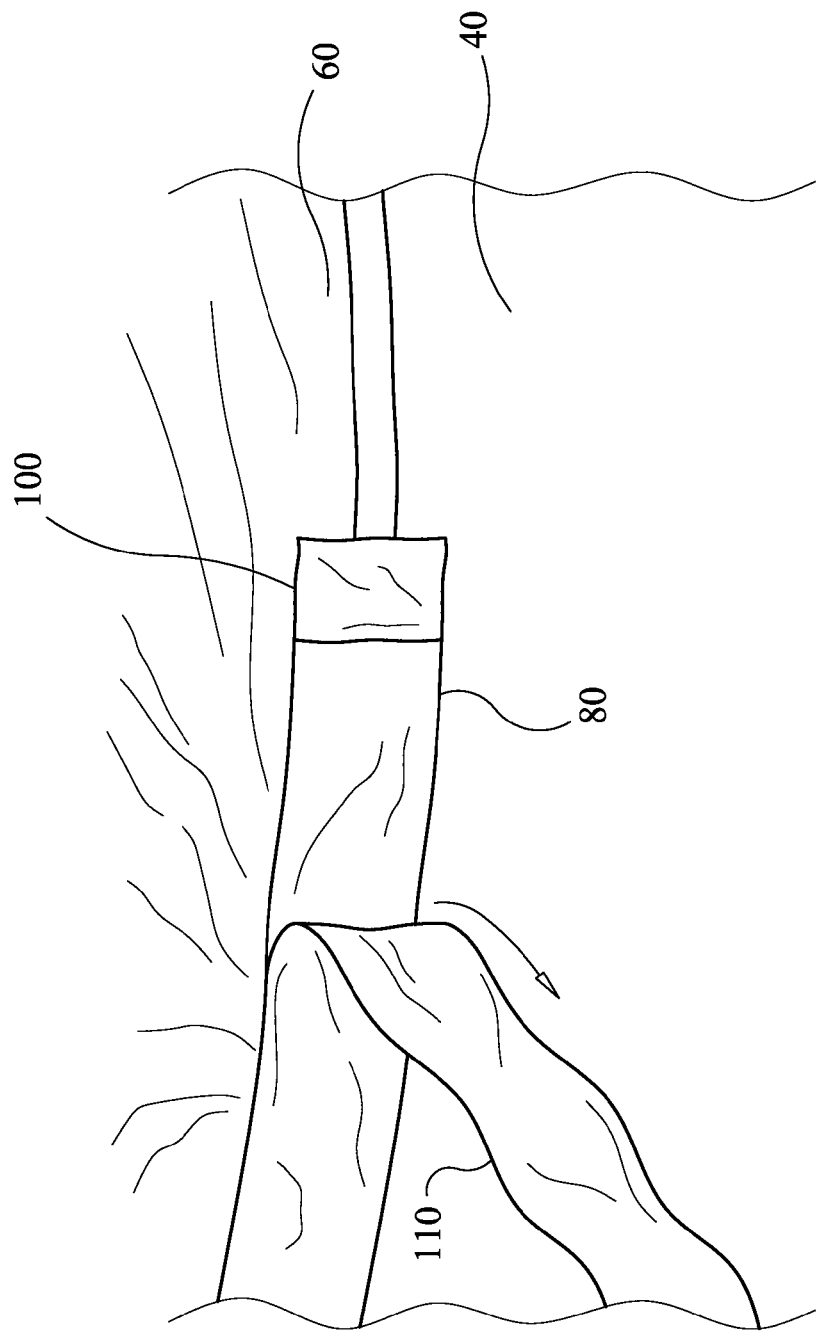
FIG. 17 shows a front perspective view of border material carrier layer being peeled off of a border strip according to the present disclosure.

FIG. 17 shows an embodiment of the present invention, whereby it is possible that one or more additional border strip 80 layers (i.e. backing layer, stabilizer layer, etc.) 110 are needed to aid in the sealing of the border strip 80 to the circular panels 40, 60 but are not required thereafter. As a thin border strip 80 may be prone to wrinkle if passed through the guiding device 620 and/or roller system 670, 672 alone, a removable backing and/or stabilizer 110 may be laminated to the thin border strip 80 that maintains a stiffer structure during manufacture which can be removed post bonding to shed unnecessary weight. Additional border strip layers 110 may be used during the manufacturing process to protect and help bond thin balloon films during the heat seal process which may be subsequently shed before preparing the balloon 20 for launch. Such additional layers 110 may be dispensed together or dispensed separately, and may be designed to fall off alone or peel off after the sealing step has been complete. Many of these additional border strip layers 110 will likely need to be removed, as illustrated in FIG. 17, before the border strip 80 overlap seals onto itself at the end of the perimeter seal 100. Likewise, additional layers 110 may be added to the circular panel surfaces 40, 60 which are subsequently removed either during or following the balloon 20 assembly.

Figure 12C:
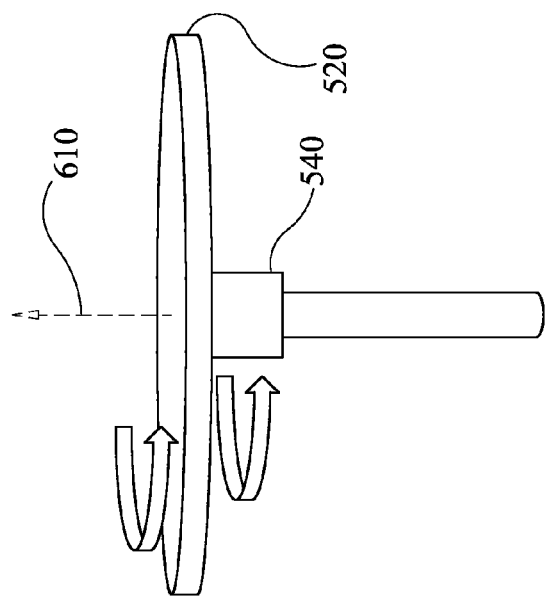
FIG. 12C shows a motor-driven support device associated with an embodiment of the apparatus according to the present disclosure.
Figure 12B:
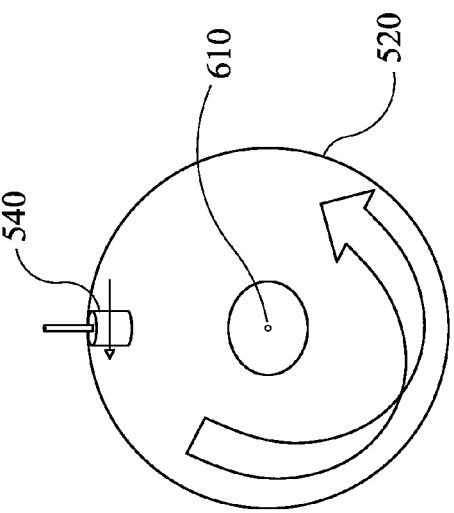
FIG. 12B shows a support device and roller drive associated with an embodiment of the apparatus according to the present disclosure.
Figure 12A:
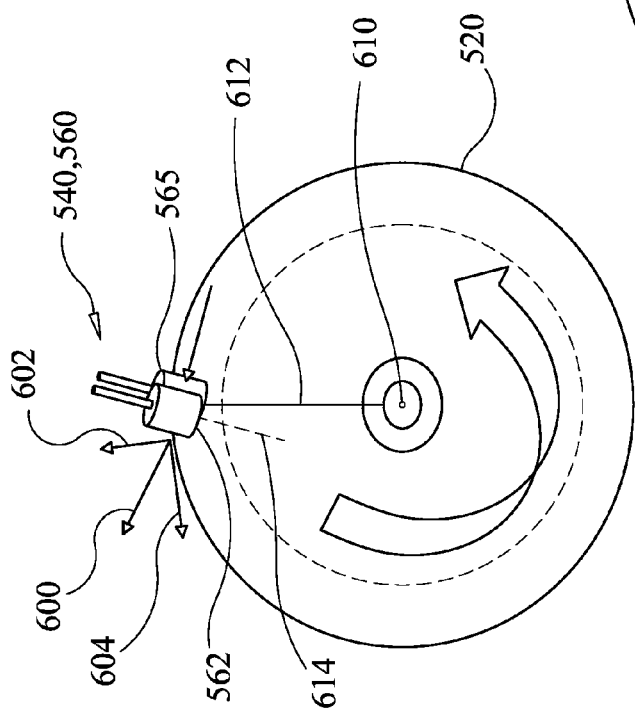
FIG. 12A shows lateral forces associated with the support device and a passive table and bonding device of apparatus of FIG. 7.

Embodiments are directed toward a substantially round table 520 that is designed to support the high altitude balloon 20 circular panels 40, 60 during manufacture. Referring to FIGS. 12A-12C, there exist many methods to spin a table 520, of which a few methods include but are not limited to the following. FIG. 12A illustrates how a passive table 520 (i.e. a non-driven table) may be manipulated to spin with the introduction of a 360 degree rotary bearing in the middle of the table 520. Furthermore, two nip and/or bonding rollers 540, 560 may be slightly angled relative a radius line 612 (extending from the center axis 610 of the table 520 to the rollers 540, 560) to drive the overhanging circular panel film 40, 60 forward and against a center table weight 580, which in turn, will place tension on the film 40, 60 and cause the table 520 and film 40, 60 to spin together while pulling out any wrinkle prone slack from the panels 40, 60.

FIG. 12B illustrates an alternative passive table 520 whereby perpendicular (angled or non-angled) nip and/or bonding rollers 540 may roll directly against the upper and/or lower table surfaces 520 to cause it to rotate on a 360 degree rotary bearing circular axis. Of course, there are also many additional ways to drive a passive table 520 in a rotational movement. Driven tables, using motors, axles, gears etc., are also abundant in alternatives and are well known in the industry.

FIG. 12C illustrates how a round tabletop 520 may be driven by means of a motor and/or axle system to spin. An advantage of a non-driven table 520, or passive table 520, is that the speed of the table 520 and web rotation may be controlled by the nip and/or bonding rollers 670, 672 without having to match with the speed at which the table 520 is turning. Such a passive table 520 can be constructed at a fraction of the cost of a driven table 520. Driven tables 520, or semi-driven tables 520, however, may offer some advantages by which we will explore in the following alternative embodiments of the present invention. Recent advances in servo motors have also simplified the task of matching speeds of varying system components. It should additionally be noted that stationary tables 520, non-spinning tables 520, among other types of support device 520 variations, would not depart from the spirit of the present invention.

In an alternative embodiment, a sealing apparatus 560 may be located on a track and travel around the edge of the substantially circular table edge 520 to complete the perimeter seal 92, 94. The border strip 80 may be dispensed from atop the track welding machine through an optional guiding device 620 exit tip 624 toward the bonding device 560.

Figure 13:
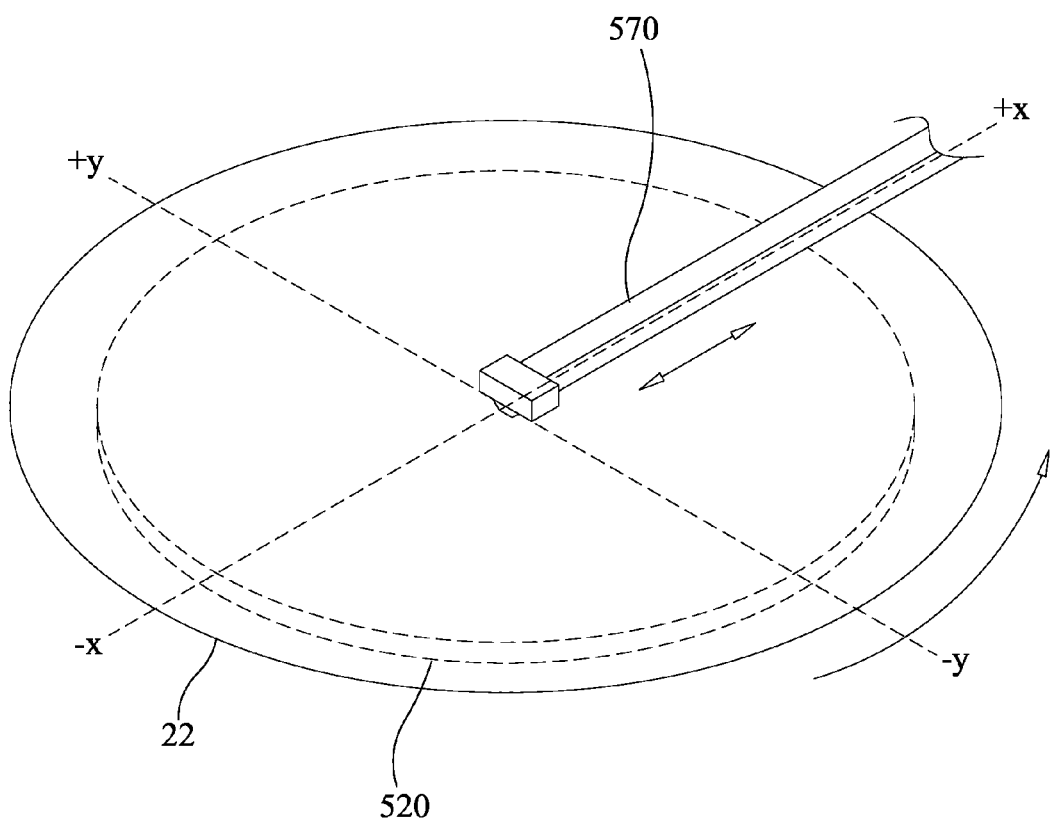
FIG. 13 shows a rotary support device and radial arm associated with an embodiment of the apparatus according to the present disclosure.

According to the present invention, turntables 520 and robots can be adapted to the mass manufacture of high altitude balloons 20, including but not limited to using indexing or continuous motion bonding methods, and the assembly and processing of nearly any task over a large balloon surface area. As illustrated in FIG. 13, a spinning driven turntable 520 and a forward/backward sliding process arm 570, for example, a robotic arm including a processing head, may process any needed work on the flat panels 40, 60. Of course, a process arm 570 need not be mounted on a radially sliding track, either above or next to the circular table 520, but can also reach out its arm 570 to span the full surface area of the tabletop 520.

FIG. 13 illustrates a turntable 520 and robot embodiment using a combination of a spinning table and a straight forward/backward track movement. With the table 520 able to spin and the robot able to slide back and forth from the circle perimeter 24 toward the center of the circle 610, the process arm 570 (or sealer, seal inspection camera, printer head, laser head, slitter blade, curing oven, 3-D printer, spray nozzle etc.—any required attachment) can arrive to any particular coordinate on the circular surface. Note that the term robot is not limited to any particular design or configuration as the particular requirement of the robotic unit may be as varied as all of the automated applications which are sought to process balloons. Many different robotic positioning techniques, hardware and software are possible locate specific panel coordinates and process both intermittent and continuous tasks on the required surface.

By maintaining portions of the inside of the balloon 20 as non-heat sealable, a host of load/restraint lines 178, ports, ballast control systems, fittings, etc. may be sealed simultaneously on the top and bottom of the balloon by adding recessed part "channels or molds" in the table 520 where the component may be held in position while sealing. Such a turntable 520/robot system can also serve similar to how a printer head does, whereby nano coatings, printed layers, designs, 3-D parts, etc. may be incorporated to diverse parts of the balloon 22 body. Such opportunities for innovation in robotics will lead high altitude balloons 20 toward longer flights than ever before imagined, soon to become becoming semi-permanent structures that can float in the upper atmosphere for years upon end.

Beyond the materials and configurations of the border strip 80 and circular panels 40, 60, we now explore the curving ability of a thicker substrate used on a larger balloon 20 that requires more pressure resistance. The present invention allows for any material and thickness of material to be used, and borders may be curved either before or during their bonding to the circular panels 40, 60. The circumferential curvature of a larger balloon 20 is often more subtle than on a smaller balloon 20, thus allowing for a more gentle curving of the thicker bordering. One alternative embodiment, however, allows for thicker materials to be used on smaller balloons 20 and for circular die stamp sealing machines to be used with pre-curved border strips 80. A border strip 80 may be pre-curved during an extrusion process, whereby the extrusion mold die is curved and a molten substrate is pushed through it to take on the same die curved shape.

In an embodiment of the present invention, and as illustrated by the contrasting panels of FIG. 1A, the top circular panel 40 of the balloon may be made of a different material than the bottom panel 60, and the panels 40, 60 can be laminated and coated differently. For example, the top panel 40 can be made of a thicker material to withstand more direct UV contact while allowing the bottom panel 60 to be thinner for weight savings. In an embodiment, the top circular panel 40 may be made with a UV blocking material and/or coating 158 to maintain the balloon's 20 gas temperature cooler during the day while the bottom circular panel 60 is "black" (attracts and traps) to infrared radiation (IR) thus maintaining the balloon's 20 gas temperature higher than usual at night. The balloons 20 can be coated and cured efficiently due to the flat nature of the circular panels 40, 60.

The flat nature of the circular panels 40, 60 also makes for simple addition of balloon components, such as valves, as well as simple processing of the second side 60 by flipping the balloon 20 over. Maintaining the balloon 20 flat until launch also limits the amount of potential pin holes, seal leaks, and other abrasion/wrinkle related problems that may arise with current high altitude balloons 20.

As is well known in the start of the art of high altitude ballooning, there are many methods to attach a payload 180 to the balloon 20, as well as optional orientations to fly the balloon envelope 22. FIG. 3B illustrate a possible payload 180 attachment method.

Figure 14:
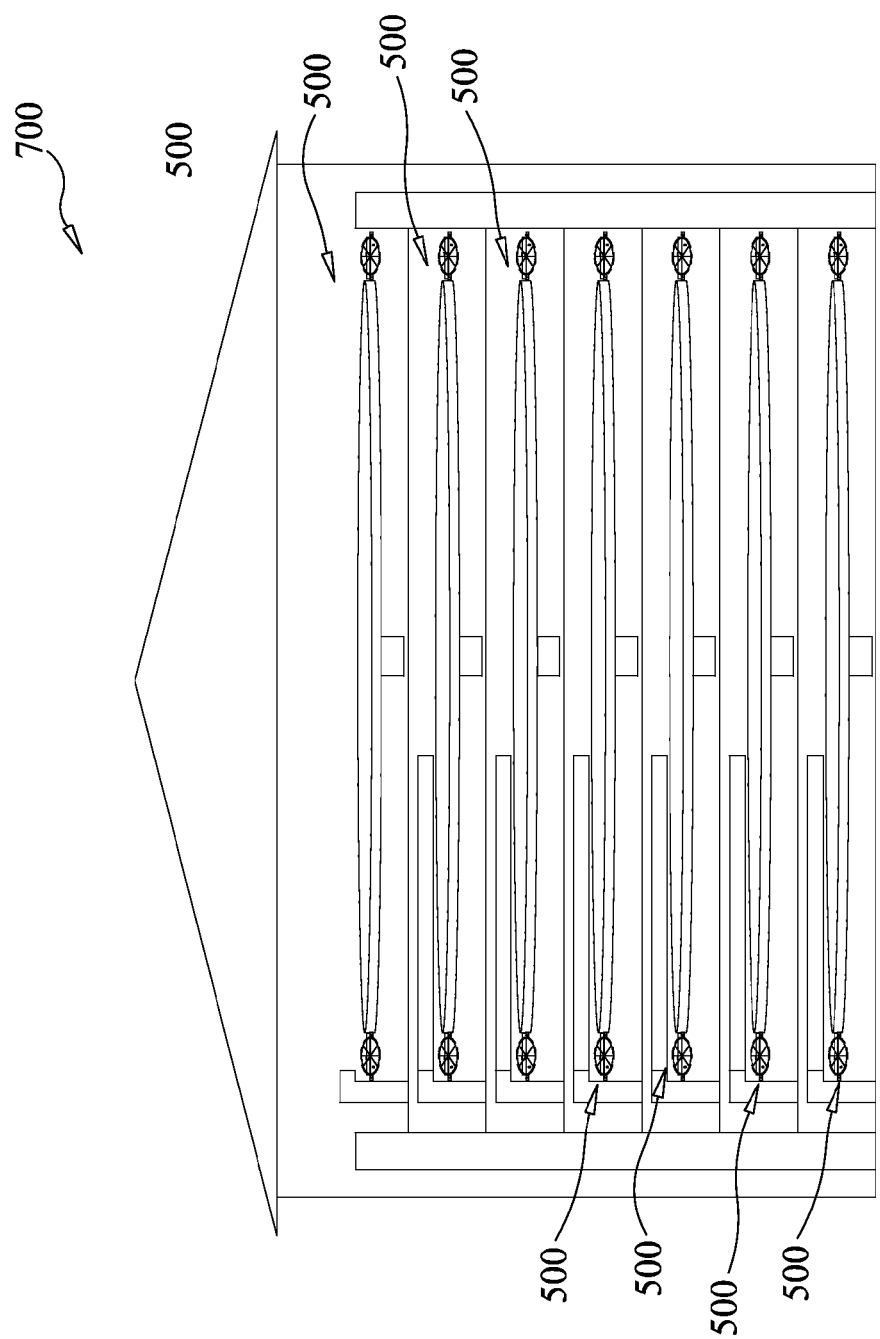
FIG. 14 shows a vertical stack of several balloon assembly apparatus according to the present disclosure.

The manufacturing methods and apparatus of the present invention may be scaled up in any configuration to allow for more balloons 20 to be made in a shorter time frame. Because high altitude balloons 20 may be large in diameter, it may prove valuable to save money on space and overhead expenses by stacking several balloon assembly tables 500 as is shown in FIG. 14. As illustrated in this figure, the tables 500 only require a small clearance on top for the circular panels 40, 60 to be fed into position. If a balloon table 500 is r feet in radius, or roughly πr2 square feet for example in total surface area, enormous savings can be achieved by stacking several tables 500 on top of others to keep from having to occupy πr2 square feet of industrial space for each table 500 needed. Many other such variations of the present invention are possible, such as sealing multiple high altitude balloons 20 simultaneously on a single table 520 by leveraging multiple layer sealing capabilities similar to the balloon 120 within a balloon 20 sealing methods.

Figure 15:
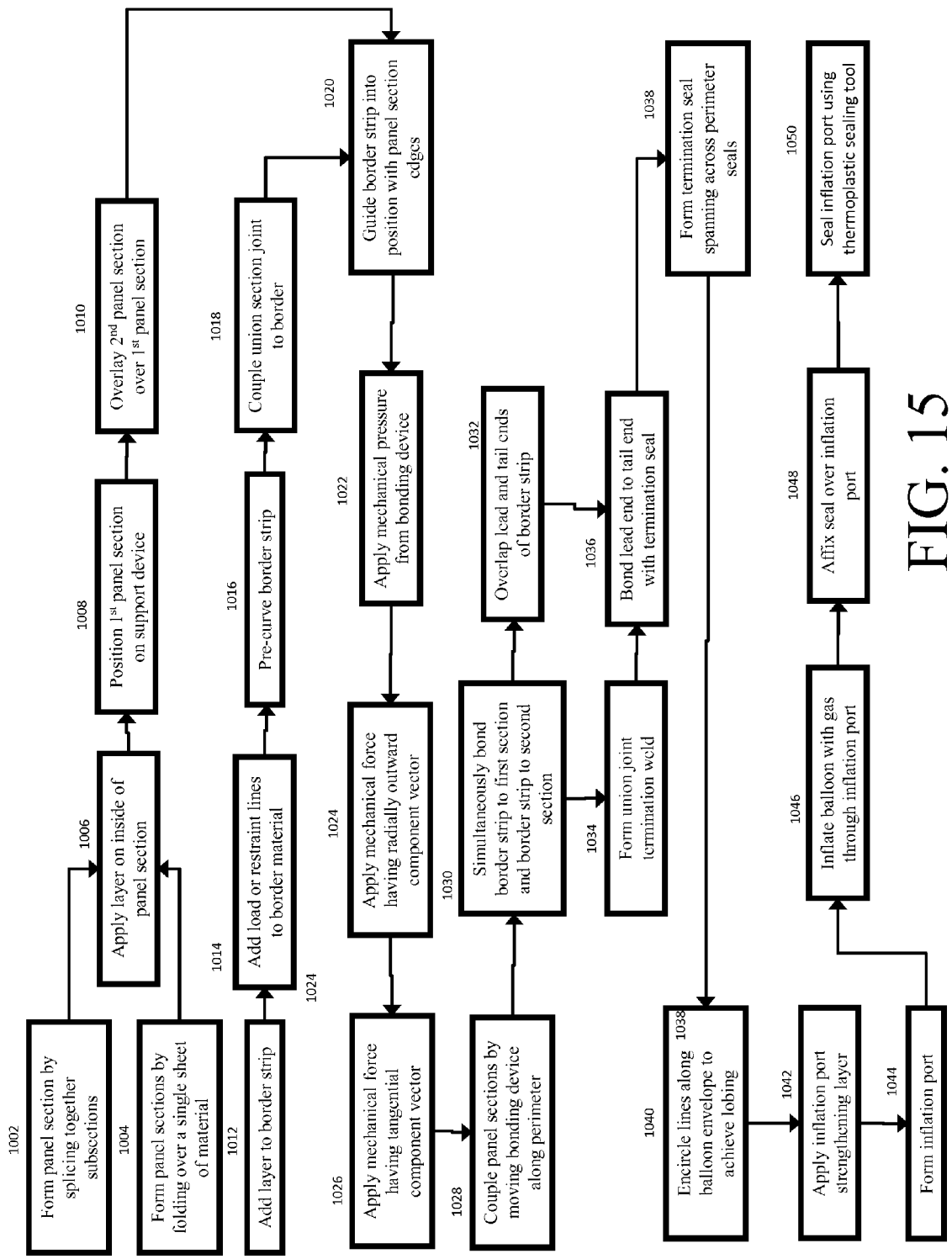
FIG. 15 is a flow chart of an illustrative process associated with the methods and apparatus for high altitude balloon manufacture according to the present disclosure.

As shown in the flowchart of FIG. 15, the process 1000 of the present invention can include a number of steps. Panels 40, 60 can be pre-formed, cut from rolls of material, formed by splicing together sub-sections in step 1002, or by folding over a single sheet of material in step 1004. An optional layer can also be applied to the inside or outside of any given panel in step 1006. The 1st panel 40 is then positioned on a support device 520 in step 1008 and a 2nd panel 60 is then overlaid over the 1st panel 40 in step 1010. Border strips 80 or perimeter material can be pre-curved or curved during manufacture. Also, additional layers can be added to the border strip 80 in step 1012, as well as any load or restraint lines 176 in step 1014, prior to manufacture. The border strip 80 is then guided relative to the bonding device 560 in step 1016. The border strip 80 can be folded over the top and bottom sides of the panels' perimeter 42, 62 in step 1018 and mechanical pressure can be applied from a bonding device 560 in step 1020. A mechanical force can be applied to the border strip 80 in step 1022 having a radially outward component vector 602 in step 1024 and a tangential component vector 604 in step 1026. The panels 40, 60 can be coupled by moving the bonding device 560 along the perimeter 24 in step 1028, thereby forming a plurality of perimeter seals 92, 94 simultaneously in step 1030 and bonding the border strip 80 to the first panel 40 and second panel 60 in step 1032. A hermetic seal 90 can be formed in step 1040 via a union joint termination seal 102 in step 1038 or by overlapping lead 86 and tail 87 ends of the border strip 80 in step 1034 and then bonding the lead end 86 to the tail end 87 with a termination seal 96 in step 1036. A termination seal 96 can then be made to span across perimeter seals 92, 94 in step 1042. Lines 176 can also be encircled along the balloon envelope 22 to achieve lobing 160 in step 1044. A hole 152 can be formed in a given panel 40, 60 in step 1046, a strengthening layer 110 can be applied around the hole 152 in step 1048, the balloon 20 can be inflated with gas through the inflation port hole 150 in step 1050, a seal 172 can be affixed over the hole 150 in step 1052, and the hole 150 can be sealed using a thermoplastic sealing tool in step 1054.

While embodiments have been illustrated and described herein in terms of several alternatives, it is to be understood that the techniques described herein can have a multitude of additional uses and applications. Accordingly, embodiments should not be limited to just the particular description, embodiments, and various figures contained in this specification that merely illustrate various embodiments. Finally, the various steps from the various alternative embodiments may be combined without departing from the spirit of embodiments described herein.

In one embodiment the materials used for the balloon panels 40, 60 are made from a lamination of PET and a sealant layer, more specifically LDPE (low density polyethylene) or LLDPE (linear-low density polyethylene). This material construction would closely resemble the balloon film construction of a polyester party balloon, but without the metallic layer in order to achieve a more transparent film that will allow for greater heat and radiation transmissivity through the membrane. The PET layer may be corona treated, or otherwise surface treated, in order to allow for greater adhesion of an adhesive layer before adding of the LDPE layer. The LDPE layer may be extruded on top of the base PET layer, or may be fabricated as a separate film layer (flat die or blown extruded for example) and then laminated to the PET layer in a laminating step.

A transparent, semi-transparent, or non-transparent barrier coating may be added to the opposite side of the PET film in a separate coating step, often completed on a base PET film before performing the LDPE laminating/extrusion coating step. A top coat over the barrier coating is possible, as is it possible to laminate/extrude another LDPE layer over the barrier coating.

Materials may be made of many different thicknesses (gauges), but one embodiment allows for typical (mass-produced for the packaging industry) PET layers of 30-300 gauge and LDPE sealant layers of 40-400 gauge. Smaller diameter balloons 20 requiring lighter material and less strength could use the lower end of the values, and larger diameter balloon 20 requiring more pressure resistance and seal strength may use middle to higher end values. Of course other values, both below and above are possible and would be well known to those in the industry. A radiation resistant additive may be added to either the base film or sealant layer film recipes.

The border strip 80 may be made of the same balloon material or may be made from another material. As the surface area of the border strip 80 may be only a small portion of the entire balloon 20 surface area, materials that would not necessarily be good for the entire balloon panel 40, 60 surface may work well as a border strip 80. For example, a fully metallized balloon film may not be appropriate because of heating up too much at the middle of the day rather than allowing for heat transmissivity like a more transparent balloon, but used as a border strip 80 it may work well. In fact, a metallic material used on the border strip 80 can have the advantage of increased barrier resistance and the second benefit of helping superheat (and even out) the weld temperature across the entire seal during the manufacturing process. As such, materials that may be advantageous for a border strip 80 may not be advantageous for a full balloon panel 40,60, and vice versa.

As before mentioned, often times one or more of the balloon panels 40, 60 should be made of substantially transparent (light and/or radiation transmissive) materials, but also need to have sufficient barrier to keep the lift gas from escaping. PE-EVOH (ethyl vinyl alcohol)-PE co-extrusions may be employed for a 2-side heat sealable balloon material, or act as a part of a laminate structure further laminated to a higher tensile strength film (such as PET). Nylon-EVOH-Nylon structures employing both high barrier and high-tensile strength (traditionally non heat sealable) are also made possible given the current invention, particularly if a sealant such as LDPE is laminated or extruded to it.

Current advances in packaging materials have sought for transparent barrier solutions that can better show the contents of a package (i.e. nuts and other food items) while also allowing for high barrier properties to maintain freshness and longer shelf-life. A multitude of different high barrier coatings and deposits, such as vacuum deposits, may be added to base films either before, after, or during subsequent laminating and coating steps. Aluminum Oxide and Silicone Oxide barrier vacuum deposits may be added to a PET base film, for example, and optionally coated with a top coat to prevent abrasion and/or humidity from damaging the barrier layer's effectiveness.

Another application for more transparent barrier advances has been that of retortable packaging. One example would be a transparent barrier film/coating such as KURARISTER which can greatly improve the barrier properties of a clear, high-tensile strength base film such as PET. Tests using these new transparent high-barrier coatings and films show that even under substantial Gelbo flexing (standardized Gelbo flex testing), pinholes and gas transmission rates are little affected. In the past, any flexing or folding of PET material would dangerously ruin PET's barrier properties and cause polyester balloon's gas transmission rates to spike. And thus, one of the key concerns that limited the use of high-tensile strength materials such as PET for modern superpressure balloon applications, that of pinhole creation, is now becoming a concern of the past with the introduction of new material coatings and the technology of the present invention. Other transparent coatings beyond that of KURARISTER include but are not limited to AlOx and other ceramic coating films, nanomaterial top coats, TERRA-BARRIER's encapsulated nanoparticle barrier film, among others.

Alternatives for materials are numerous because of the wealth of selection in the packaging industry. Hundreds of base films, sealant layers, barrier layers, barrier coatings, top coats, adhesive layers, laminations, extrusions, surface treatments, thicknesses, additives, darker color pigments, among other film options are currently available and many more will be available in the coming years.

New ultra-high tensile strength, ultra-light, and ultra-high barrier materials such as graphene, carbon nano-tubes, aerogels, among many others will become more commercially available and allow for great improvements in material properties which can be leveraged with the technology of the current invention for longer balloon float durations. Many of the conventional balloon manufacturing methods do not allow for the full advantage of high and ultra-tensile strength materials as their inferior seal configurations and complex assembly processes create a multitude of imperfections and weak spots whereby the balloon fails under low pressure far before an ultimate tensile strength of the balloon film itself has been reached. The present invention will allow for impressive advances in high altitude balloon 20 material selection and deployment to take place.

Multiple co-extrusions and laminations of many kinds are well known in the balloon 20 and packaging industries, as many layers of materials such as PE, EVOH, Nylon, PVDF (Saran), PTFE (TEFLON), Polyurethane (PU), Polypropylene (PP), polycarbonate, polystyrene, among many others may be co-extruded and/or laminated together in many different layers. Barrier additives may also be added to the film extrusion mix in order to increase final film barrier.

In one embodiment, the border strip 80 is made of the same type and gauge PET film as the balloon panels 40, 60, but has been sealant layer (LDPE) extrusion coated 158 on both sides. Thus we may have 30-300 gauge PET film with one 40-400 gauge LDPE heat seal layer extruded on one side 40 and another 40-400 gauge LDPE heat seal layer extruded on the second side 60. In order to have higher barrier properties, a metallic layer or barrier coating 158 may be processed on one side of the PET film before the two sides are extrusion coated 158 or laminated with the LDPE sealant layer 158. This could resemble a typical party balloon film structure of Aluminum metallized layer+adhesive+PET+adhesive+LDPE, but adding another LDPE layer on top of the Aluminum metallized layer to make the film two-side heat sealable. This configuration can also be modified with transparent barrier coatings 158 or other barrier layers and coatings 158 between the two outer-facing heat sealable sides. Adding a barrier layer between a base film and a sealant layer can often weaken the bonding strength of a sealant layer. Thus, the side chosen with the barrier layer and sealant layer should be used on the non-panel facing side of the border 80 and used for the border strip lead 86 and tail end 87 to seal up over itself 102, a seal that does not ultimately receive much pressure resistance as the balloon 20 inflates. Thus, a weaker bonded sealant layer with high barrier that may not work well for a full panel sealant layer may work well for a border strip layer 110 in order to keep high barrier properties and allow it to seal up over itself.

In one embodiment, the border strip 80 is made of the same type and gauge PET film as the balloon panels 40, 60, but has been sealant layer (LDPE) extrusion coated 158 on both sides. Thus we may have 30-300 gauge PET film with one 40-400 gauge LDPE heat seal layer extruded on one side 40 and another 40-400 gauge LDPE heat seal layer extruded on the second side 60. In order to have higher barrier properties, a metallic layer or barrier coating 158 may be processed on one side of the PET film before the two sides are extrusion coated or laminated with the LDPE sealant layer. This could resemble a typical party balloon film structure of Aluminum metallized layer+adhesive+PET+adhesive+LDPE, but adding another LDPE layer on top of the Aluminum metallized layer to make the film two-side heat sealable. This configuration can also be modified with transparent barrier coatings 158 or other barrier layers and coatings 158 between the two outer-facing heat sealable sides. Adding a barrier layer between a base film and a sealant layer can often weaken the bonding strength of a sealant layer. Thus, the side chosen with the barrier layer and sealant layer should be used on the non-panel facing side of the border 80 and used for the border strip lead 86 and tail end 87 to seal up over itself 102, a seal that does not ultimately receive much pressure resistance as the balloon 20 inflates. Thus, a weaker bonded sealant layer with high barrier that may not work well for a full panel sealant layer may work well for a border strip layer in order to keep high barrier properties and allow it to seal up over itself.

The invention claimed is:

1. A high altitude balloon (20), comprising:
   a first panel (40) having at least a first circumferential perimeter (42);
   a second panel (60) having at least a second circumferential perimeter (62); and
   a border strip (80) defining a first portion (84) and a second portion (83) across a width of the strip, the first portion coupled with the first circumferential perimeter of the first panel and the second portion coupled with the second circumferential perimeter of the second panel such that upon inflation of the balloon, the first circumferential perimeter of the first panel is positioned adjacent to, and not sealingly coupled to, the second circumferential perimeter of the second panel and the border strip sealingly couples the first panel and the second panel.

2. The high altitude balloon of claim 1, wherein the border strip is comprised of a single strip of material.

3. The high altitude balloon of claim 1, wherein the first and second panels and border strip form a balloon envelope (22) having a hermetic seal.

4. The high altitude balloon of claim 1, wherein the first and second panels are substantially circular.

5. The high altitude balloon of claim 1, wherein:
   the first panel and second panel each have a heat sealable surface (44, 64) and at least one of the first and second panels has a non-heat sealable surface (45, 65);
   the heat sealable surfaces of the first and second panels face outwards and the non-heat sealable surfaces of the films face inwards; and
   the border strip has at least one heat sealable surface sealed to the heat sealable surface of the first panel and the heat sealable surface of the second panel.

6. The high altitude balloon of claim 1, further comprising at least one internal bladder; and wherein:
   the at least one internal bladder comprises a third panel (124) and a fourth panel (126), each of the third and fourth panels having at least one heat sealable surface (122); and
   the heat sealable surfaces of the third and fourth panels face inwards and define a fin seal therebetween and adjacent the circumferential perimeters of the third and fourth panels.

7. The high altitude balloon of claim 1, further comprising at least one internal bladder (120).

8. The high altitude balloon of claim 1, wherein:
   the first panel and the second panel each define a heat sealable surface;
   the heat sealable surfaces of first and second panels face inwards; and
   the border strip includes at least one heat sealable surface sealed to the inward facing heat sealable surface of the first panel and the inward facing heat sealable surface of the second panel, and the border strip includes at least one non-heat sealable surface.

9. The high altitude balloon of claim 1, wherein at least one of the first and second panels consists of a plurality of sub-sections coupled together.

10. The high altitude balloon of claim 1, wherein the border strip has substantially equal tensile strength and substantially equal maximum pressure resistance as at least one of the first panel and the second panel.

11. The high altitude balloon of claim 1, wherein at least one of the first and second panels includes at least one of a radiation resistant material and a radiation resistant coating.

12. The high altitude balloon of claim 1, wherein at least one of the first and second panels includes at least one of a radiation reflective material and a radiation reflective coating.

13. The high altitude balloon of claim 1, wherein at least one of the first and second panels includes at least one of a radiation absorbent material and a radiation absorbent coating.

14. The high altitude balloon of claim 1, further comprising a payload (180) positioned inside the balloon.

15. The high altitude balloon of claim 1, wherein the first portion of the border strip and the first circumferential perimeter of the first panel form at least a first lap seal and the second portion of the border strip and the second circumferential perimeter of the second panel form at least a second lap seal.

16. The high altitude balloon of claim 15, wherein a lead end (86) and a tail end (87) of the border strip overlap and the lead and tail end are sealed together with a termination seal (96) spanning the first lap seal and the second lap seal, thereby hermetically sealing the balloon.

17. The high altitude balloon of claim 15, further comprising a union joint section of material; and wherein the union joint section couples a lead end (86) and a tail end (87) of the border strip, thereby hermetically sealing the balloon.

18. The high altitude balloon of claim 1, further comprising an inflation port and a port closure; and wherein:
   the inflation port comprises a through hole defined by at least one of the first panel, the second panel, and the border strip; and the port closure is heat sealed over the hole and to the at least one of the first panel, the second panel, and the border strip.

19. The high altitude balloon of claim 18, wherein the inflation port further comprises a reinforcing layer spanning the hole, the reinforcing layer coupled to the at least one of the first panel, the second panel, and the border strip; and wherein the hole is further defined through the reinforcing layer.

20. The high altitude balloon of claim 1, further comprising a reinforcement patch (172) bonded to an outside surface of at least one of the first panel, the second panel, and the border strip.

21. The high altitude balloon of claim 20, further comprising a payload line guided by the reinforcement patch.

22. The high altitude balloon of claim 1, further comprising at least one line (176) spanning a substantially vertical circumference of the first panel and the second panel, the at least one line providing balloon lobing.

23. The high altitude balloon of claim 22, further comprising a plurality of tubular guides (174), each of the plurality of tubular guides guiding the at least one line, and each of the plurality of tubular guides bonded to at least one of the border strip, the first panel, and the second panel.

* * * * *